(12) United States Patent
Grue et al.

(10) Patent No.: US 12,039,148 B2
(45) Date of Patent: *Jul. 16, 2024

(54) SEARCHING DIGITAL CONTENT

(71) Applicant: Dropbox, Inc., San Francisco, CA (US)

(72) Inventors: Anthony Grue, San Francisco, CA (US); Tom Kleinpeter, Kirkland, WA (US); Tina Wen, Oakland, CA (US); Andrew Haven, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,428

(22) Filed: Oct. 31, 2022

(65) Prior Publication Data
US 2023/0088796 A1 Mar. 23, 2023

Related U.S. Application Data

(63) Continuation of application No. 17/202,048, filed on Mar. 15, 2021, now Pat. No. 11,487,405, which is a
(Continued)

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 16/58* (2019.01); *G06F 16/5866* (2019.01); *G06F 16/587* (2019.01)

(58) Field of Classification Search
None
See application file for complete search history.

(56) References Cited

U.S. PATENT DOCUMENTS 7,747,625 B2 6/2010 Gargi et al.
7,890,526 B1 2/2011 Brewer et al.
(Continued)

OTHER PUBLICATIONS

Non-Final Office Action from U.S. Appl. No. 14/608,762, mailed Jan. 13, 2020, 21 pages.
(Continued)

*Primary Examiner* — Tuan S Nguyen
(74) *Attorney, Agent, or Firm* — Keller Preece PLLC

(57) ABSTRACT

One or more embodiments allow a user to search a gallery of digital content. In particular, a user can interact with a digital content system to search for, and identify, one or more digital content items (e.g., photos, videos, audio) within a collection of digital content. For instance, the digital content system can maintain tokens with respect to a collection of digital content and associate the tokens with digital content items within the collection of digital content. The digital content system can also provide a gallery of digital content items within a view area of a graphical user interface. Upon receiving a search query, the digital content system can identify a token and identify digital content items corresponding to the token. The digital content system can further provide a new or modified gallery within the view area of the graphical user interface based on the identified digital content items.

20 Claims, 11 Drawing Sheets

Related U.S. Application Data continuation of application No. 16/917,623, filed on Jun. 30, 2020, now Pat. No. 10,955,998, which is a continuation of application No. 14/608,762, filed on Jan. 29, 2015, now Pat. No. 10,725,614.

(60) Provisional application No. 62/076,398, filed on Nov. 6, 2014.

(51) Int. Cl.
    *G06F 16/58*     (2019.01)
    *G06F 16/587*     (2019.01)

(56) References Cited

U.S. PATENT DOCUMENTS

| | | | |
|---|---|---|---|
| 7,917,528 B1 | 3/2011 | Dave et al. | |
| 8,185,558 B1 | 5/2012 | Narayanan et al. | |
| 9,298,816 B2* | 3/2016 | Dimassimo | G06F 16/3344 |
| 9,342,524 B1* | 5/2016 | Doty | G06F 16/50 |
| 9,875,284 B1* | 1/2018 | Amacker | G06F 16/24578 |
| 2005/0246324 A1* | 11/2005 | Paalasmaa | G06F 16/951 |
| 2005/0278331 A1 | 12/2005 | Hatori et al. | |
| 2006/0044416 A1 | 3/2006 | Miyazaki et al. | |
| 2009/0198675 A1* | 8/2009 | Mihalik | G06F 16/248 |
| | | | 707/999.005 |
| 2009/0307626 A1 | 12/2009 | Jalon et al. | |
| 2012/0185498 A1 | 7/2012 | Loofbourrow et al. | |
| 2012/0203764 A1 | 8/2012 | Wood et al. | |
| 2012/0296743 A1 | 11/2012 | Velipasaoglu et al. | |
| 2012/0303600 A1 | 11/2012 | Mukhopadhyay et al. | |
| 2013/0205243 A1 | 8/2013 | Rivera et al. | |
| 2013/0330019 A1 | 12/2013 | Kim et al. | |
| 2014/0282011 A1 | 9/2014 | Dellinger et al. | |
| 2014/0310255 A1 | 10/2014 | Cardell et al. | |
| 2015/0006505 A1* | 1/2015 | Plakhov | G06F 16/3328 |
| | | | 707/710 |
| 2015/0084883 A1 | 3/2015 | Kim et al. | |
| 2015/0106358 A1* | 4/2015 | Nachum | G06F 16/248 |
| | | | 707/722 |
| 2017/0242898 A1 | 8/2017 | Su et al. | |

OTHER PUBLICATIONS

Non-Final Office Action from U.S. Appl. No. 17/202,048, mailed Mar. 16, 2022, 19 pages.

Notice of Allowance from U.S. Appl. No. 14/608,762, mailed May 20, 2020, 5 pages.

Notice of Allowance from U.S. Appl. No. 16/917,623, mailed Dec. 30, 2020, 19 pages.

Notice of Allowance from U.S. Appl. No. 17/202,048, mailed Jul. 29, 2022, 16 pages.

\* cited by examiner

SEARCHING DIGITAL CONTENT

CROSS REFERENCE TO RELATED APPLICATIONS

This application is a continuation of U.S. patent application Ser. No. 17/202,048, filed Mar. 15, 2021, which is a continuation of U.S. patent application Ser. No. 16/917,623, filed Jun. 30, 2020 which issued as U.S. Pat. No. 10,955,998, which is a continuation of U.S. patent application Ser. No. 14/608,762, filed Jan. 29, 2015 which issued as U.S. Pat. No. 10,725,614, which claims the benefit of and priority to U.S. Provisional Application No. 62/076,398, filed Nov. 6, 2014. Each of the aforementioned applications are hereby incorporated by reference in their entirety.

BACKGROUND

1. Technical Field

One or more embodiments of the present disclosure generally relate to providing a gallery of digital content. More specifically, one or more embodiments disclosed herein relate to systems and methods for searching a gallery of digital content and providing digital content in accordance with the search.

2. Background and Relevant Art

Computing devices (e.g., computers, tablets, smart phones) provide numerous ways for people to capture, create, share, view, and otherwise interact with numerous types of digital content. For example, many computing devices allow users to interact with digital content by capturing, sharing, and experiencing digital content (e.g., digital photos or videos). Overtime, a typical user can collect a large amount of digital content. As the amount of digital content increases, it becomes more difficult for a user to experience digital content in an efficient and enjoyable manner. In particular, conventional systems for presenting digital content have several disadvantages.

For example, many conventional systems do not allow a user to efficiently search and/or navigate a large number of digital content items. In particular, many conventional systems provide a user interface to allow a user to browse digital content items by providing a display of digital content items (e.g., digital photos) through which a user may navigate. For instance, many conventional systems provide a user interface that may require a user to manually scroll through the entire display to locate a particular digital content item (e.g., a particular digital photo). As such, when a user collects hundreds, or perhaps thousands, of digital content items, the process of scrolling through the large number of digital content items to locate particular content can be time consuming, inefficient, and frustrating for a user.

Additionally, searching digital content items on a local device can utilize a significant portion of the memory and/or storage on the local device. For example, typically local devices have limited memory and/or storage for maintaining and providing access to hundreds or thousands of digital content items. Moreover, performing a search of thousands of digital content items often requires significant memory in order to process a search and identify relevant digital content items corresponding to the search. As such, conventional systems often experience significant storage space and memory constraints with respect to storing and searching digital content on a local device.

To reduce the amount of memory and/or storage used on a local device related to digital content, many conventional systems use remote storage (e.g., off-device storage) to store digital content items. For instance, a local device can upload a collection of digital content items to a remote server to free up storage on the local device. Nevertheless, when navigating, searching, or otherwise interacting with the digital content items on the remote server, conventional systems require a connection to the remote server on which the digital content items are maintained. As such, when a local device does not have a connection to the remote server (e.g., the Internet), or when a remote server is temporarily down or unavailable, the user may be unable to search, navigate, or access the digital content items.

In addition, when a users searches for a digital content item on a remote server, conventional systems perform the search within the remote server, and return search results from the remote server to the local device over a network connection. Thus, while the use of a remote server to maintain digital content items typically frees up memory and/or storage on the local device, the process of sending a query from a local device to a remote server, performing a digital content item search on the remote server, and returning query results from the remote server to the local device can be a time consuming, error prone, and thus frustrating to a user.

Accordingly, there are a number of considerations to be made in managing and searching digital content.

SUMMARY

Embodiments of the present disclosure provide benefits and/or solve one or more of the foregoing or other problems in the art with systems and methods for providing digital content to a user. For example, one or more embodiments include systems and methods for searching and identifying one or more digital content items (e.g., photos, videos, audio) within a gallery of digital content items. In particular, the systems and methods described herein can provide a gallery of digital content items to a user via a graphical user interface. In one or more embodiments, a user can provide a search query via the graphical user interface, and in response, the systems and methods described herein can perform a search to identify one or more digital content items. Based on identifying one or more digital content items, the systems and methods can provide a modified gallery that includes digital content items corresponding to the search query.

Additionally, one or more embodiments provide a graphical user interface that allows a user to easily and efficiently search and/or navigate through a large number of digital content items. In particular, one or more embodiments include receiving a search query from a user, processing the search query, and presenting digital content items based on results of the search query within a graphical user interface. For example, the client device can receive a search query from a user, identify one or more tokens associated with the search query, and provide a modified gallery of digital content items that includes identified digital content items associated with the identified token(s). As such, a user can easily search and/or navigate a gallery of digital content items to locate one or more digital content items of interest to the user.

Further, one or more embodiments can include methods and systems that reduce the amount of storage and/or memory related to maintaining, searching, and navigating digital content items on a client device. For example, one or more embodiments can include storing digital content items on a remote server, while providing a user the ability to efficiently search for digital content items on a client device. For example, one or more embodiments include systems and methods of associating digital content items with one or more indexes maintained on a client device. In general, the indexes require only a small fraction of storage compared to digital content items. Thus, based on receiving a search query, the systems and methods described herein can include identifying digital content items related to the search query based only on the indexes on the client device. As such, a user can perform a search for digital content items while minimizing the usage of memory and storage on a client device.

In addition to conserving memory and storage, one or more embodiments include systems and methods that allow a user to use a client device to search for digital content items maintained on a remote server, regardless of whether the client device can communicate with the remote server (e.g., an Internet connection). For instance, the systems and methods described herein can store digital content items on an online content management system, while maintaining reduced-sized versions of the digital content items (e.g., thumbnails) on a client device. In one or more embodiments, the systems and methods can associate tokens with reduced-sized versions of the digital content items to create one or more indexes that are maintained on the client device. Due to maintaining the tokens, indexes, and reduced-sized versions of the digital content items directly on the client device, the systems and methods disclosed herein allow a user to search for digital content items regardless of whether the client device can communicate with the online content management system.

Furthermore, one or more embodiments can include systems and methods that increase the speed and efficiency of digital content item searches. For example, rather than sending a query and searching a remote server, a client device can perform a local search using tokens, indexes, and reduced-size versions of digital content items stored on the client device. Therefore, the systems and methods disclosed herein can allow a client device to quickly search, identify, and display digital content items, by eliminating the need to query a remote server, perform a search on the remote server, and await a result from the remote server.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1:
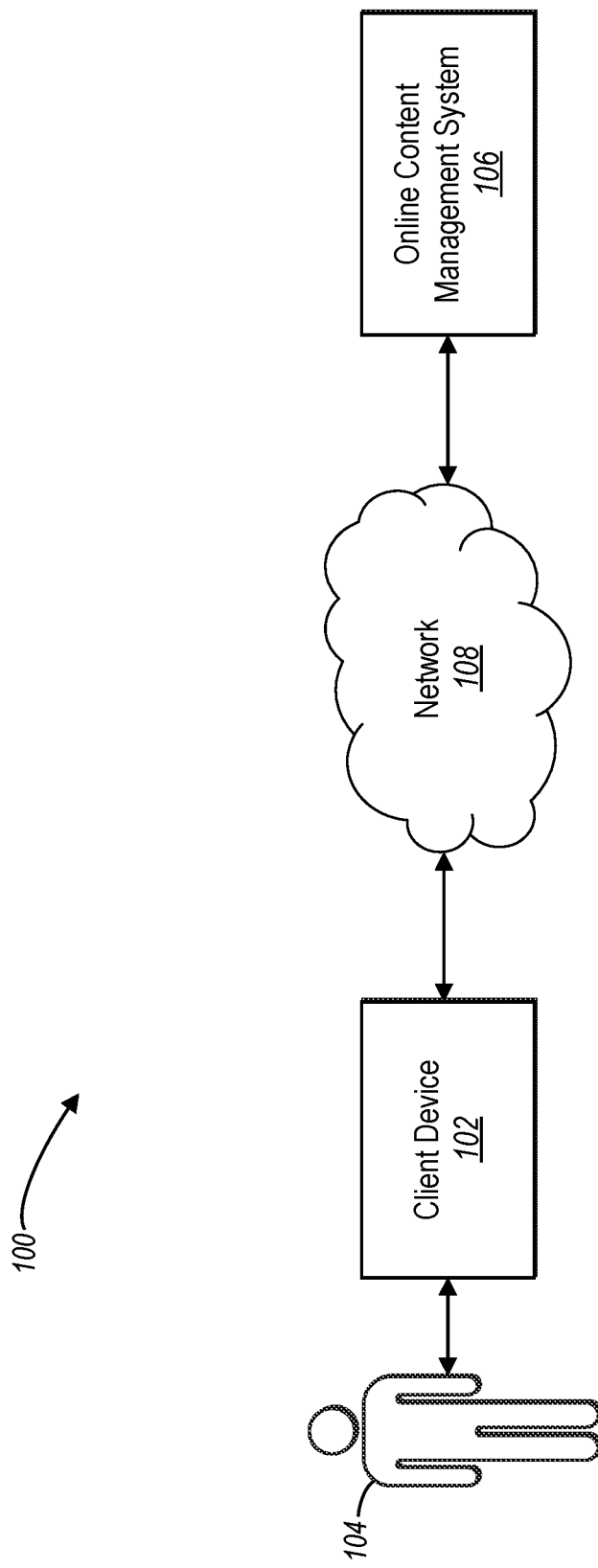
FIG. 1 illustrates a block diagram of an environment for implementing a digital content system in accordance with one or more embodiments.

The present disclosure provides one or more embodiments of a digital content system that allows a user to search a gallery of digital content. In particular, a user can interact with the digital content system (or simply "system") to search for, and identify, one or more digital content items (e.g., photos, videos, audio) within a collection of digital content items. In one or more embodiments, the system can associate each of the digital content items within the gallery with one or more tokens. In addition, the system can provide a user a gallery of digital content items via a graphical user interface. Based on receiving a search query from a user, the system can identify one or more tokens that relate to the search query, and subsequently identify each digital content item associated with the identified tokens. Further, the system can provide a modified gallery within the graphical user interface based on the identified digital content items. For example, the modified gallery can represent a filtered gallery that includes the identified digital content items based on the search, and removes digital content items not identified by the search.

Additionally, one or more embodiments of the system can provide a graphical user interface that allows a user to easily and efficiently search and/or navigate through a large number of digital content items. For example, the system can associate digital content items with one or more tokens to increase the speed and efficiency of searching digital content items. In particular, unlike many conventional systems that have to process a search query with respect to each individual digital content item, one or more embodiments of the system allows for the identification of digital content items while only needing to process a search query with respect to tokens. For instance, the system can identify tokens based on the search query, and then identify digital content items associated with each of the identified token(s).

In one or more embodiments, the system can minimize the use of memory and/or storage on a client device compared to conventional systems. For example, in one or more embodiments, the system can cause the client device to upload a collection of digital content items to an online content management system. As such, the client device can have access to the digital content items (e.g., via the online content management system), while also reducing or eliminating the amount of storage space the digital content items would otherwise consume if the client device maintained the digital content items.

In addition, and as mentioned above, due to the system using a token-based search structure, the system can accurately process a query of large numbers of digital content items while drastically reducing the amount of memory used to perform the search compared to conventional systems. For example, in one or more embodiments, the token-based search structure can provide a first level search of the digital content items that quickly and efficiently identifies a manageable amount of digital content items that potentially match a particular search query. The system can then provide a second level search on only the digital content items that indicated a potential match based on the first level search.

To briefly illustrate the first and second level search process, assume that the digital content items are photos, and that the system maintains the photos in chronological order by date (e.g., by day). The system can further associate a token with one or more a specific days that correlate with days that include photos that match the token. In such a case, the first level search can include identifying the digital content items that match the days associated with a token. Identifying the photos for the specific days associated with the token uses minimal computing resources, while at the same time quickly narrows the pool of potential matches to the search query. In one or more embodiments, the first level search can produce the final results of a search query, thereby eliminating the need to do the second level search (e.g., the user provides a date type query such as a specific date).

In the event the first level search does not produce the final results (e.g., the user provides an content type query such as location), the system can perform the second-level search on only the photos identified from the first level search. For example, the user may have searched for "Dallas," and based on the first level search, the system identified all the digital content items for the days on which there is a photo associated with Dallas. However, because there is a possibility that a day includes a photo associated with Dallas, as well a photo associated with another city, the system can use the second level search to finalize the search results. In particular, the system can search each of the photos identified from the first level search for a location tag (e.g., metadata) indicating a location of Dallas. Therefore, due to the token-based search structure, matching search results can be quickly and accurately obtained while minimizing computing resources.

In addition to conserving memory and storage space, the system can also allow a client device to search digital content items maintained on an online content management system without the need to access the online content management system. For instance, unlike many conventional systems that send a search query to a remote server, and remotely process the search query, the system disclosed herein allows a client device to identify one or more locally stored tokens to determine which digital content items may potentially relate to the search query. As such, the system allows a user to perform a search of digital content items maintained on an online content management system without requiring direct access to the online content management system. Therefore, based on one or more of the above features, as well as additional features and details explained below, one or more embodiments of the system can increase a user's enjoyment and experience of digital content items by allowing a user to easily search a large collection of digital content items, and quickly find digital content items in which a user has a particular interest.

As used herein, "digital content" refers to any digital data. For example, the terms "digital content item," "content item," and "digital item" can include a defined portion of digital data (e.g., a data file). Examples of digital content items include, but are not limited to, digital photos, digital video files, digital audio files, electronic document files of all types, streaming content, contact lists, and/or folders that include one or more digital content items. The term "digital content item," "content item," and "digital item" may refer interchangeably to the digital content items themselves, as well as to representations of digital content items. For example, representations of digital content items can include reduced-sized versions of digital content items (e.g., thumbnail images, low-quality audio files, compressed video files).

Additionally, as used herein, a "collection of digital content" (or simply "collection") refers to any defined group of digital content items. A collection can include a single type of digital content item or multiple different types of digital content items. Additionally, a collection can include as few as one content item, but in many instances, a collection can include a large number of content items. Although the present disclosure provides specific examples related to digital image collections (e.g., photos and videos), one will appreciate that the principles described herein may be applied to other types of collections of digital content, such as a music collections, document collections, and/or any other type of digital content collection.

In one or more embodiments, a collection of digital content items may be provided via a graphical user interface. As used herein, a gallery of digital content items, or simply "gallery," refers to a presentation of a collection, or a portion of a collection, of digital content items within a graphical user interface. In particular, a gallery of digital content items can allow a user to browse a collection of digital content by navigating within the gallery (e.g., scrolling the gallery of digital content items through a view area of the graphical user interface, as described in detail with reference to FIGS. 4A-C). A gallery can have various formats depending, for instance, on the type of digital content items included in a collection. For example, a gallery can have a grid of images in a collection of digital photos. Alternatively, a gallery of document files can be formatted into a list of file names.

Additional features and characteristics of one or more embodiments of a digital content system are described below with respect to the Figures. For example, FIG. 1 illustrates a block diagram of an example embodiment of a digital content system 100 (or simply "system 100"). In general, and as illustrated in FIG. 1, system 100 can include client device 102 that is associated with user 104. Client device 100 may communicate with online content management system 106 via network 108. In some embodiments, client device 102 can perform or provide various functions, features, processes, and systems as described herein. Additionally, or alternatively, online content management system 106 can perform or provide one or more of the various functions, features, processes, and systems described herein. In one or more embodiments, client device 102 and online content management system 106 can coordinate together to perform or provide the various functions, features, processes, and systems, as described in more detail below.

Generally, client device 102 can include any one of various types of client devices. For example, client device 102 can be a mobile device (e.g., smart phone), tablet, laptop computer, desktop computer, or any other type of computing device as further explained below with reference to FIG. 8. Client device 102, online content management system 106, and network 108 may communicate using any communication platforms and technologies suitable for transporting data and/or communication signals, including any known communication technologies, devices, media, and protocols supportive of remote data communications, examples of which are also described below with reference to FIG. 8.

As an initial overview of one or more embodiments of system 100, client device 102 can obtain one or more digital content items. In particular, client device 102 can capture, store, receive, or otherwise access multiple digital content items. For example, user 104 can take a photo using client device 102 (e.g., a smart phone). Furthermore, client device 102 can maintain the photo or a copy of the photo within storage on client device 102. Additionally, client device 102 can receive digital content items from various sources, such as electronic communications from other users (e.g., email, IM, SMS text), websites, digital content servers, and/or any other source of digital content with which client device 102 may communicate. In addition, client device 102 can organize the multiple digital content items into one or more collections of digital content.

In one or more embodiments, the system 100 can cause client device 102 to share one or more digital content items to online content management system 106 via network 108. In particular, and as illustrated in FIG. 1, client device 102 can provide digital content items and/or copies of digital content items to online content management system 106 by sending, sharing, or otherwise providing digital content items to online content management system 106. In some embodiments, system 100 can cause client device 102 and online content management system 106 to synchronize digital content items maintained on client device 102 and/or online content management system 106. Additional detail and explanation with relating to one or more embodiments of an online content management system are discussed below with reference to FIG. 9.

In some embodiments of system 100, client device 102 and online content management system 106 facilitate providing client device 102 with access to large amounts of digital content, while simultaneously reducing the amount of used storage on client device 102. In particular, client device 102 can provide full-size versions of digital content items to online content management system 106, and as a result, the client device 102 can remove the full-size digital content items from client device 102 to reduce used storage. As used herein, "full-size" digital content items refer to high-quality versions of digital content items. Typically, full-size digital content items have larger file sizes, and therefore, increase the amount of storage needed on client device 102. In many cases, a full-size version of a digital content item is the original version of a digital content item (e.g., the data image file resulting form user 104 capturing a digital photo).

To maximize the accessibility of experiencing digital content on client device 102, while at the same time minimizing storage usage, client device 102 can generate and/or maintain reduced-size versions of digital content items corresponding to the full-size digital content items that online content management system 106 maintains. As used herein, a "reduced-size" digital content item is generally a lower quality version of a digital content item that corresponds to a full-size digital content item. A reduced-size digital content item can provide a representation of the corresponding full-size digital content item. For example, a reduced-size version of a digital photo can include a thumbnail that corresponds to a full-size digital photo. In some embodiments, client device 102 can generate and maintain reduced-size digital content items for a collection of digital content items within storage on client device 102. Alternatively, client device 102 can receive reduced-size digital content items from a third-party system (e.g., online content management system 106).

In addition to maintaining digital content, online content management system 106 can also perform one or more processes with system 100. In particular, upon receiving digital content items from client device 102, online content management system 106 can analyze the digital content items and provide analysis information corresponding to the digital content items to client device 102. Client device 102 can use the analysis information to identify digital content items having one or more characteristics, as indicated in the analysis information.

For example, and as will be explained in further detail below, online content management system 106 can analyze one or more digital content items to detect, determine, or identify various characteristics of each digital content item. In one or more embodiments, for example, online content management system 106 can detect content type (e.g., photo, video, panorama), actual content within a digital content item (e.g., people within a photo), and/or other characteristics of digital content items. Based on an analysis of digital content items, online content management system 106 can provide client device 102 with analysis information that the client device can user to associate digital content items with the identified characteristic, as described in additional detail below in connection with FIG. 2.

In addition to obtaining and maintaining digital content items, system 100 can allow user 104 to interact with the digital content items. In particular, client device 102 can provide a graphical user interface that includes a gallery of digital content items with which the user can interact. For example, for a collection of digital photos, client device 102 can provide a gallery of thumbnails corresponding to the full-size digital photos located on the online content management system 106. The graphical user interface can allow user 104 to interact with the gallery via a graphical user interface. For instance, user 104 can view, share, send, edit, organize, or otherwise interact with the digital content items within the gallery.

One way in which user 104 can interact with digital content items is to search for one or more particular digital content items. For example, user 104 can provide a search query via the graphical user interface to enable user 104 to search the gallery and identify one or more digital content items that relate to the search query. Additional details regarding systems and methods of searching a collection of digital content items is described below in connection with FIG. 2.

Figure 2:
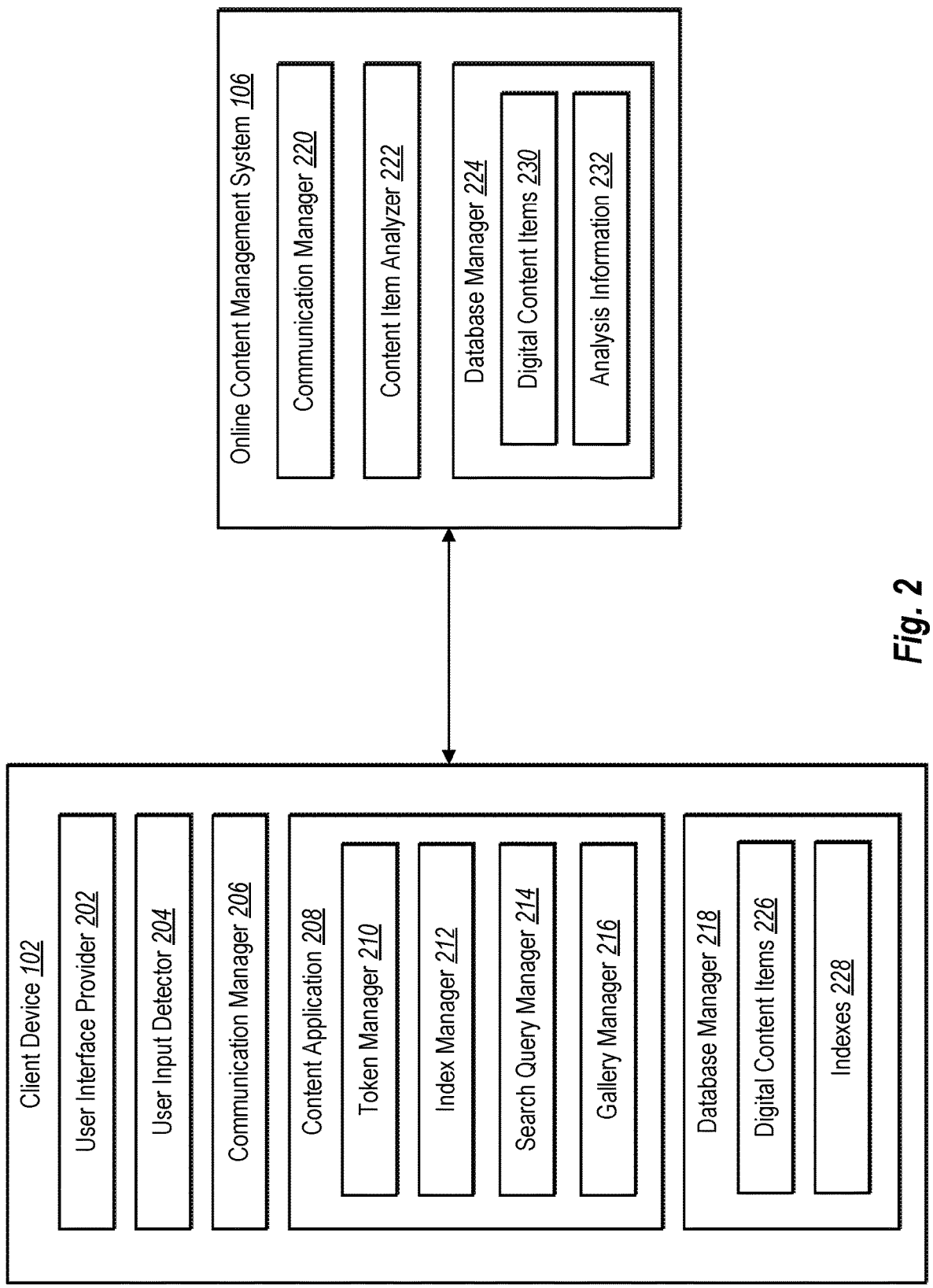
FIG. 2 illustrates a schematic diagram of a digital content system in accordance with one or more embodiments.

FIG. 2 illustrates an example embodiment of client device 102 and online content management system 106 (or simply "online system 106") that may operate within digital content system 100 described with respect to FIG. 1. As shown, client device 102 can include, but is not limited to, user interface provider 202, user input detector 204, and communication manager 206. In addition, client device 102 can include content application 208, which includes token manager 210, index manager 212, search query manager 214, gallery manager 216 and database manager 218. In one or more embodiments, the database manager 218 can include digital content items 226 and indexes 228.

Each of components 202-218 of client device 102 may be in communication with one another using any suitable communication technologies. In addition, although components 202-218 are shown separately in FIG. 2, any of components 202-218 may be combined into fewer components, such as into a single component, or divided into more components as may serve a particular embodiment. In addition, components 202-218 may be located on, or implemented by, one or more computing devices, such as one or more client devices and/or one or more server devices (e.g., online system 106).

As further shown in FIG. 2, online system 106 can include, but is not limited to, communication manager 220, content item analyzer 222, and database manager 224, which may include digital content items 230 and analysis information 232. Each of components 220-224 of online system 106 may be in communication with one another using any suitable communication technologies. It will be recognized that although components 220-224 are shown separately in FIG. 2, any of components 220-224 may be combined into fewer components, such as into a single component, or divided into more components as may serve a particular embodiment. Components 220-224 may be located on, or implemented by, one or more computing devices, such as one or more server devices.

Each of components 202-224 can comprise software, hardware, or both. For example, each of components 202-224 can comprise one or more instructions stored on a computer-readable storage medium and one or more processors of one or more computing devices to execute instructions. When executed by the one or more processors, the computer-executable instructions cause a computing device to perform the methods described herein.

Alternatively, components 202-224 can comprise hardware, such as a special purpose processing device to perform a certain function or group of functions.

As mentioned above, and as shown in FIG. 2, client device 102 can include user interface provider 202. User interface provider 202 can provide a graphical user interface (or simply "user interface") that allows user 104 to navigate, browse, view, share, manage, and/or otherwise experience digital content using client device 102. For example, user interface provider 202 can provide a user interface that facilitates a presentation of digital content on client device 102 (e.g., on a display screen). Likewise, user interface provider 202 can provide a user interface that facilitates navigating a gallery of digital content items. For example, user interface provider 202 can provide a user interface that allows user 104 to search a collection of digital content items.

More specifically, user interface provider 202 may provide (e.g., by way of a display screen associated with client device 102) a variety of interactive elements within the user interface. For example, user interface provider 202 can cause client device 102 to present one or more graphical objects that represent digital content items. For instance, in one or more embodiments, user interface provider 204 can present reduced-size versions of digital images (e.g., thumbnails). Alternatively, user interface provider 202 may facilitate a presentation of other types of digital content (e.g., audio, videos, webpages, documents), depending on the particular application of client device 102.

In addition, user interface provider 202 can cause client device 102 to present one or more interactive elements that enable navigation and browsing of digital content within a view area of a user interface. For example, in one or more embodiments, user interface provider 202 can cause client device 102 to present a search interface to allow user 104 to search a gallery of digital content items and/or view the results of a search. For example, user interface provider 202 can provide a query input field, a display of suggested search terms (e.g., suggested tokens), and/or provide a modified gallery of content items based on the results of the search query.

As further illustrated in FIG. 2, client device 102 can include user input detector 204. In one or more embodiments, user input detector 204 can detect, identify, and/or receive a user interaction and translate a user interaction into a user input (e.g., a user command or request). As referred to herein, a "user interaction" means a single interaction, or combination of interactions, received from user 104 by way of one or more input devices. In some embodiments, user input detector 204 can translate a combination of user interactions as a single user input and/or translate a single user interaction into multiple user inputs.

For example, user input detector 204 can detect a user interaction from a keyboard, mouse, screen, or any other input device. In the event a touch screen is used as an input device, user input detector 204 can detect one or more touch gestures (e.g., swipe gestures, tap gestures, pinch gestures, or reverse pinch gestures) that user 104 provides to the touch screen. In one or more embodiments, user 104 can provide one or more touch gestures in relation to and/or directed at one or more graphical objects, items, or elements of a user interface presented on a touch screen. User input detector 204 may additionally, or alternatively, receive data representative of a user interaction. For example, user input detector 204 can receive one or more user configurable parameters from user 104, one or more user commands from user 104, and/or any other suitable user input.

User interface provider 202 can utilize user input and/or other data received from user input detector 204 to manage, control, and/or facilitate the use of a user interface. In general, in response to user input detector 204 detecting one or more user interactions, user interface provider 202 can provide a user interface that allows user 104 to view, search, edit, share, and/or otherwise experience digital content within a user-friendly and intuitive user interface. For example, in response to user input detector 204 detecting one or more touch gestures, user interface provider 202 may allow user 104 to navigate and/or search through a gallery of digital content within a user interface.

As mentioned above, and as illustrated in FIG. 2, the client device 102 may further include a communication manager 206. The communication manager 206 can facilitate receiving and sending data to and from the client device 102. In particular, communication manager 206 can facilitate sending and receiving electronic communications. For example, the communication manager 206 can package content to be included in an electronic communication and format the electronic communication in any necessary form that is able to be sent through one or more communication channels and using an appropriate communication protocol, as described herein.

Furthermore, the communication manager 206 can facilitate requesting content from sources outside of client device 102. To illustrate, upon a user interacting with a digital content item within a gallery of digital content items, the communication manager 206 can request the selected digital content item from the online system 106. Thus, the communication manager 206 request and receive digital content items, or other information, from sources inside or outside the client device 102.

Furthermore, and as briefly mentioned above, FIG. 2 illustrates client device 102 can include content application 208. Content application 208 can include an application associated with online system 106 (e.g., the online system 106 provider also provides content application 208). For example, content application 208 can be a stand-alone or native application that can be installed and executed on client device 102 to facilitate interaction between the client device 102 and online system 106. In one or more embodiments, the client application 208 can access application functions, client device functions, and/or online system 106 functions to accomplish one or more of the methods and process described herein.

In one or more embodiments, content application 208 can include token manager 210, as shown in FIG. 2. In general, token manager 210 can generate, receive, determine, identify and/or maintain one or more tokens to associate with one or more digital content items. For example, a token generally can describe at least a characteristic of a digital content item. In one or more embodiments, for example, a token can include one or more names, words, numbers, characters, or combination of identifiers associated with a characteristic of a digital content item. In particular, token manager 210 can determine and maintain various tokens on client device 102 that relate to various types of digital content item characteristics. Additionally, in one or more embodiments, online system 106 can also maintain a copy of tokens on online system 106 (e.g., as a backup dataset).

For example, a token can relate to a temporal characteristic of when the digital content item was received, captured, or otherwise obtained. In some examples, a token may correspond to a specific day, month, or year. Moreover, a token may correspond to any combination of a day, week, month, and/or year. Additionally, a token can include a day of the week, or a time of day.

Similar to a standard dates characteristics, a temporal characteristic can be associated with special occasions associated with a particular date. In one or more embodiments, for example, tokens can include holidays, such as Thanksgiving, Memorial Day, Christmas, Hanukkah, Ramadan, Boxing Day, New Year's Eve, New Year's Day, or any other day of significance. In one or more embodiments, a user can specify a particular date associated with a personal day of significance, such as birthdays or anniversaries.

As another example, a token may relate to a location (e.g., location of client device 102 upon capturing a digital photo). For instance, a token can correspond to an address, name of a location, a neighborhood, GPS location, city, state, country, or other type of location. Other examples of locations can include an approximate location (e.g., "near home," "south of San Francisco"), for example, in a case that a particular location is near a more recognizable or defined location name.

Likewise, a token may relate to facilities or businesses located at a geographic location associated with a digital content item. For example, a token can include the name of a restaurant, theater, retail store, event center (e.g., stadiums and arenas), or any other establishment located at a particular geographic location associated with a digital content item.

In addition, using facility information, token manager 210 can provide tokens that include events. For example, token manager 210 can access a table of events that includes a name of an event, a date and time of the event, and a location of the event. In one or more embodiments, token manager 210 can use date, time, and location information to search the table of events for any corresponding events to the date, time, and location of a particular photo. Upon identifying an event, token manager 210 can generate an event token with the name of the event (e.g., Burning Man, Giants v. Packers, Boston Marathon).

Additionally or alternatively, a token can correspond to source characteristics, such as whether a digital content item has been shared, viewed, or edited. For example, a token can correspond to whether a photo is kept by a user, captured by a user, shared by a user, or associated with a shared folder. Additionally, the token can correspond to an identity of a sending user or receiver user associated with sharing of the digital content item. Further, token manager 210 can provide one or more tokens associated with user interactions with a digital content item (e.g., user views, user ratings, user comments) that may occur with respect to digital content items. In some embodiments, token manager 210 can generate a token based on a number of user interactions, maximum user interactions, type of user interaction, or any combination thereof.

In some embodiments, a token can correspond to data file characteristics associated with digital content items. For example, a token can correspond to a type of digital content item, such as audio, video, or photo files (e.g., file extensions). Additionally, a token can correspond to more detailed information associated with the type of digital content such as a file size of a photo, orientation of a the photo (e.g., landscape, portrait), whether the photo is a screenshot, or other information associated with one or more photos.

Additionally, in some embodiments, a token can correspond to the actual content within a digital content item. For example, in the case of an audio digital content item, a token can correspond to a type of music, artist name, title of song, length of song, number of times a user has listened to a song, etc. In another example including photos, the token can correspond to the identity of a person in the photo (e.g., based on user tags or facial recognition), number of detected faces (e.g., three faces in a photo), close up portrait of a person, group picture of many people, predominant colors, or any other determinable characteristic associated with the content of the photo.

As part of managing tokens, token manager 210 can determine when to generate a token. For example, token manager 210 can generate one or more tokens based on a collection of digital content items. For instance, token manager 210 can detect a characteristic of one or more digital content items within a collection, and in response, the token manager 210 can generate one or more tokens that relate to the detected characteristic of one or more digital content items within a collection. As an example, a token manager 210 can determine that a collection of content items includes several digital content items associated with a location of New York. Accordingly, token manager 210 can generate a token of "New York."

In some embodiments, token manager 210 can maintain one or more pre-defined tokens independent of digital content items within a gallery. For example, token manager 210 can maintain a default tokens for any number of days, weeks, months, years, and/or holidays, independent of whether a digital content item exists for a particular day, week, month, year, or holiday. For instance, in some embodiments, token manager 210 can generate a date token for every day within a period of time (e.g., every day from 1950 through 2050). Alternatively, token manager 210 can generate a date token for any day associated with at least one digital content item within a gallery of digital content items.

Additionally, and as shown in FIG. 2, content application 208 can include index manager 212. Generally, index manager 212 can associate one or more digital content items with tokens. In particular, index manager 212 can associate tokens with one or more digital content items. In some embodiments, associating a digital content item with a token includes generating an index for a token that includes a reference to one or more digital content items. For example, index manager 212 can generate an index corresponding to a token, the index including one or more references to one or more digital content items that correspond to the token. In some embodiments, index manager 212 can generate an index for each token. Alternatively, index manager 212 can generate multiple indexes for any number of tokens.

In associating digital content items and tokens, index manager 212 can associate any number of tokens with any number of digital content items. In particular, index manager 212 can associate a digital content item with one token, or alternatively, index manager 212 can associate a digital content item with a plurality of different tokens.

In addition, in one or more embodiments, index manager 212 can create an index for a combination of tokens. For instance, index manager 212 can generate a first index associated with a token of "2014." Further, index manager 212 can generate a second index associated with a token of "New York City." Additionally, the index manager can create an index for the combination of tokens "New York City" and "2014." In particular, the combination index would reference only those digital content items that are referenced in both the "2014" index, as well as the "New York City" index.

The index manager 212 can reference digital content items within an index in a variety of ways depending on the nature and characteristics of the digital content items. For example, in the case of a collection of digital images (e.g., photos, videos), content application 208 can maintain or otherwise organize the digital images in a chronological order. For example, in one or more embodiments, content application 208 can group content items by day. The natural "day" characteristic associated with captured digital images provides an efficient way to easily and efficiently reference digital images. Moreover, users often search for digital images based on temporal attributes or characteristics of the digital image. Therefore, index manager 212 can reference digital content items by referencing a day associated with a digital image that corresponds to a token.

To illustrate, in one or more embodiments index manager 212 associate digital content items having a characteristic corresponding to a token for an index by referencing the days associated with the digital content items. For example, if the token for the index is "Thanksgiving," the index manager can include a day reference for every date for Thanksgiving for the last 50 years. Thus, index manager 212 would include a reference for a total of 50 days (e.g., the last 50 Thanksgiving holidays). As another example, an index may correspond to the token "2009." Index manager 212 would then include a day reference for every date within the year 2009 (e.g., the "2009" index would include a reference to 365 days).

In one or more embodiments, index manager 212 can referenced the days using a specialized day value data structure that increases the efficiency of referencing days. For example, in one or more embodiments, index manager 212 can reference days using a bit vector. In one or more embodiments, index manager 212 can utilize a library (e.g., bit magic) to reference various day values, while providing efficient memory management. In particular, a bit vector can facilitate an efficient reference to any number of day values associated with a particular token for a specific index. For example, a bit vector can provide a reference to all days of a particular year, or a particular day of every year for a defined number of years. Thus, and as will be explained further below, upon receiving a search query, content application 208 only need to identify a token related to the search query, which would then allow the content application 208 to identify each day that includes a digital image that has a characteristic that matches the search query.

In addition to using day values to reference digital content items within an index, index manager 212 can user other content values to reference digital content items within an index. For instance, one or more embodiments of an index can include a listing of one or more identifiers of digital content items (e.g., each digital content item may have a unique identifier, and an index many include a listing of unique identifiers for digital content items that correspond to the token associated with the index. In one or more embodiments, the unique identifiers can also be referenced by way of a bit vector structure.

Due to the efficient use of memory and storage, content application 208 can facilitate a search within a collection of digital content using the tokens and indexes discussed above. For example, and as shown in FIG. 2, client device 102 can include search query manager 214 for receiving, processing, and responding to search queries received from a user with reference to a collection of digital content. For example, search query manager 214 can communicate with user interface provider 202 and user input detector 204 to facilitate a presentation of a query input field, receive a query, and identify one or more digital content items that match the query.

Specifically, search query manager 214 can receive a search query from user 104. In particular, search query manager 214 can communicate with user input detector 204 to receive a user interaction in connection with the query input field. For example, search query manager 214 can receive a query via a user selection and/or user 104 indicating one or more characters via a user input device.

In some embodiments, a query manager 214 runs a new search with each received character. For example, upon a user inputting the character "N," query manager 214 can process a query and identify any token that begins with the character "N" (e.g., November, New York, Nathan). Based on receiving an additional character, "o," query manager 214 can process another query to identify any token that begins with the characters "No" (e.g., November, but not New York and not Nathan). In identifying a token, search query manager 214 can consider exact matches, partial matches, related terms, or other criteria in identifying a token corresponding to the search query. In some embodiments, search query manager 214 can identify the token most closely corresponding to the search query. Alternatively, the search query manager 214 can identify multiple tokens or a combination of tokens corresponding to the search query.

In addition to directly identifying a token in response to a search query, search query manager 214 can cause the client device 102 to present one or more token suggestions to user 104 to assist the user in quickly identifying one or more tokens associated with the digital content items user 104 seeks. In particular, in addition to directly identifying a token based on a user input query, search query manager 214 can also identify one or more token suggestions that are associated with one or more digital content items referenced in the index of the directly identified token.

To illustrate, user 104 can input the character "N." As discussed above, search query manager 214 can directly identify the token "November" that is associated with an index including a day reference to all November days for the last 50 years. In addition, query manager 214 can determine that the token "2009" is associated with an index including one or more of the same day references as those day references included in the "November" index. Thus, upon search query manager detecting the day reference match (e.g., or in other words, a day reference intersection) between the "November" index and the "2009" index, search query manager 214 can provide a token suggestion of "November 2009" to user interface provider 202 to present to user 104. User 104 can then select the token suggestion (e.g., by providing a tap gesture directed at the display of the token suggestion), and search query manager 214 can process a new search query based on the token combination of "November 2009."

As can be appreciated from the above explanation, token suggestions can include any number of token combinations. For example, query search manager 214 can detect a day reference intersection between days in the directly identified token index, and one, two, three or more other indexes associated with tokens that were not directly identified. In this way, query manager 214 can quickly suggest token suggestion, allowing user 104 to locate a particular digital content item with easily and efficiently.

As further illustrated in FIG. 2, client device 102 can include gallery manager 216 for managing a gallery of digital content items. In particular, gallery manager 216 can manage a display of digital content items corresponding to a collection of digital content stored on client device 102 and/or online system 106. In some embodiments, gallery manager 216 can communicate with user interface provider 202 and user input detector 204 to provide a gallery of digital content items (e.g., in the case of photos, a presentation of thumbnail images) with which user 104 can interact. For example, as discussed above, gallery manager 216 can facilitate user 104 interacting with the gallery of content items by viewing, sharing, editing organizing, or navigating through the gallery of digital content items provided via a user interface.

In addition to presenting a gallery, gallery manager 216 may also provide a modified gallery of digital content items in accordance with digital content items identified by search query manager 214. In particular, gallery manager 216 may provide a modified gallery of digital content items to user 104 based on the digital content items identified by search query manager 214. For example, gallery manager 216 may receive an identification of one or more digital content items from search query manger 210, and in response, provide a presentation package of the identified digital content items to user interface provider 202 for presentation on client device 102 as the modified gallery of digital content items.

In one or more embodiments, and as discussed above, the search query manager 214 may provide one or more day references to gallery manager 216. Based on the one or more day references, gallery manager 216 can filter a gallery of digital content items by identifying only those digital content items corresponding to the one or more day references. Gallery manager 216 can then provide a modified gallery view to user interface provider 202, and the user interface provider can cause the client device 102 to present the modified gallery to user 104.

In some embodiments, providing a modified gallery to user 104 can include presenting the gallery in a variety of ways. For example, providing a modified gallery can include providing a gallery of digital content items including only those digital content items identified by search query manager 214. Additionally, providing a modified gallery can include providing a gallery associated with a collection of digital content items and removing any of the digital content items from the collection that are not identified by search query manager 214. In another example, providing a modified gallery may include reordering a presentation of digital content items to more prominently display those digital content items identified by search query manager 214. Other examples may include providing a modified gallery of digital content items with emphasized thumbnails, highlighted images, or other presentation of a gallery of digital content items based on the identified digital content items.

In one or more embodiments, in addition to identifying digital content items to include in a modified gallery of digital content items, gallery manager 216 (or search query manager 214) can rank the identified digital content items based on an analysis and determination of the level of user interest in each of the identified digital content items. For instance, content application 208 can keep a history of accessed digital content items, and based on frequency and/or recency of access, a digital content item may be ranked higher or lower (e.g., the more frequent and more recent the access, the higher the rank). Other factors may be analyzed in determining a rank, such as strength of match with a search query, date of digital content item (e.g., newer items are ranked higher than older items), favorite locations and/or favorite people (e.g., number of digital content items associated with a particular location or a particular person).

Notwithstanding any potential ranking of digital content items, in one or more embodiments, gallery manager 216 can provide an updated modified gallery to user 104 with every updated search query. In particular, gallery manager 216 can update a presentation of the modified gallery as user 104 provides each character into a search field. For example, upon receiving a first character in a search field, search query manager 214 can identify one or more tokens and associated digital content items, and gallery manager 216 can provide a modified gallery of digital content items based on the identified digital content items. Further, as user 104 provides a second character, or otherwise modifies the search query, search query manager 214 can identify a different set of tokens in view of the modified search query, and thus provide digital content items based on the one or more tokens.

As mentioned above, and as shown in FIG. 2, client device 102 can include database manager 218. Database manager 218 can manage storage of digital content items and information associated with digital content items on one or more databases located on client device 102. In particular, database manager 218 can maintain digital content items 226, as illustrated in FIG. 2. For example, digital content items 226 can include reduced-size versions of full-size version digital content items (e.g., digital content items 230 on database manager 224 of online system 106).

Additionally, database manager 218 can manage storage and/or access to one or more indexes 228 corresponding to various tokens. In particular, and as described above, database manager 218 may maintain an index for each token, the index including a reference to digital content items associated with the token. For example, database manager 218 can store and/or provide access to any index for identifying digital content items based on one or more tokens.

Additionally, as shown in FIG. 2, online system 106 can include a communication manager 220. Communication manager 220 can facilitate communication between online system 106 and client device 102. In particular, communication manager 220 can receive digital content from client device 102 as well as provide digital content to client device 102. For example, communication manager 220 can receive (via upload) copies of digital content items from client device 102. Additionally, communication manager 220 can provide (via download) access to copies of the digital content items to client device 102. In some embodiments, providing access to digital content may include transmitting copies of the digital content to client device 102. Alternatively, providing access to digital content may include providing access to client device 102 to a database on which the digital content is maintained.

Additionally, as shown in FIG. 2, online system 106 can further include content item analyzer 222. In particular, content item analyzer 222 can perform an analysis on digital content items received from client device 102 and generate analysis information. For example, content item analyzer 222 can analyze data associated with digital content items, such as metadata, file type, file size, or other information to determine one or more characteristics associated with the digital content received from client device 102. Upon calculating, generating, or otherwise obtaining the analysis information, communication manager 220 can provide the analysis information to client device 102.

In some embodiments, content item analyzer 222 can generate analysis information from the content of digital content items. For instance, content item analyzer 222 can analyze a photo, video, or other type of digital content item and determine one or more characteristics associated with the photo, video, or other type of digital content item. As an example, content item analyzer 222 can analyze a collection of photos and determine whether the content of the photos includes one or more faces. In particular, content item analyzer 222 can analyze each digital content item in a collection of digital content items and identify each individual content item having one or more faces.

In addition to detecting the presence of one or more faces, content item analyzer 222 can generate variety of analysis information associated with the content of different digital content items. For example, content item analyzer 222 can determine a number of faces within each digital content item. Additionally, in some embodiments, content item analyzer 222 can identify the identity of one or more faces using facial recognition technology. In some embodiments, content item analyzer 222 may analyze other aspects of the digital content item and identify landscapes, buildings, plants, colors, or any number of characteristics associated with the content of the digital content items.

In addition to analyzing content of digital content items and identifying various characteristics, content item analyzer 222 can use additional information to generate analysis information associated with each digital content item. In particular, content item analyzer 222 can consider information accessible to online system 106 and/or information obtained via a third-party server in generating analysis information associated with different digital content items. For example, where a digital content item includes location information (e.g., location of client device 102 when taking a photo), content item analyzer 222 can extrapolate analysis information using information from sources other than the digital content items. For example, based on location information associated with a photo, content item analyzer 222 can determine that the photo was taken near a particular place of business (e.g., a restaurant). In providing the analysis information to client device 102, online system 106 can provide an identification of the restaurant and an identification of any photos or other digital content items taken near that restaurant.

In a further example of providing analysis information based on location of a digital content item, content item analyzer 222 can further compensate for possible inaccuracies in the location information associated with one or more digital content items. For example, where a location of a photo is near multiple restaurants, content item analyzer 222 can identify some or all restaurants near the location associated with a photo and provide a listing of each restaurant and associated photo identity to client device 102. As such, even where content item analyzer 222 is unable to determine the exact location associated with a particular photo, content item analyzer 222 can provide multiple locations to assist client device 104 in receiving and processing a search query for a particular location.

In some embodiments, due to the potential inaccuracies in the location information, the name of the restaurant may not result in a token match until a threshold level of confidence is determined by the content application 208. For instance, when a search query includes only one or limited characters that may correspond to many possible tokens, content application 208 can provide a presentation of token suggestions based on a confidence value associated with a particular token, combination of tokens, or type of token. For example, content application 208 may determine that certain token suggestions are prone to inaccuracy unless a search query includes a minimum number of characters. As such, in some embodiments, client application may determine to withhold certain tokens, combinations of tokens, or types of tokens as token suggestions unless a search query includes a minimum number of characters or, alternatively, a minimum level of correlation exists between the search query and a token suggestion.

As an example of providing token suggestions based on confidence values, tokens associated with dates may have a higher confidence value than tokens associated with specific locations. For instance, a token or combination of tokens associated with a date or time may have a high confidence value such that client device 102 can provide one or more possible token suggestions based on a search query that includes only a single character. Alternatively, a token or combination of tokens associated with a specific location (e.g., a restaurant) may have a lower confidence value such that client device 102 can provide one or more possible location token suggestions 430 if the search query includes a minimum of three characters. In some embodiments, client device 400 may only identify some tokens upon identifying an exact match between a search query and a token. Other tokens, combinations of tokens, or types of tokens can have higher or lower confidence values.

Upon analyzing the content of digital content items and identifying various characteristics, content item analyzer 222 can communicate the analysis information to communication manager 220 and provide the analysis information to client device 102. In some embodiments, the analysis information provided to client device 102 can include an identification of any digital content items within a gallery of digital content items associated with a particular characteristic. For example, online system 106 can provide a listing of identifier for each digital content item within a gallery having a single face, multiple faces, or any specific number of faces. Additionally, online system 106 can provide the identity of any number of people within the content of a digital content item. Further, online system 106 can provide additional information, such as a listing of restaurants, addresses, or names of places associated with each digital content item based on additional information accessible to online system 106 (e.g., via a third-party server). In some embodiments, communication manager 220 can provide one or more tokens or indexes to client device 102 for use in processing search queries. Alternatively, communication manager 220 can provide a listing of digital content item identifiers and associated characteristics to client device 102 for use in generating tokens and indexes on client device 102.

Additionally, as shown in FIG. 2, system 206 can further include database manager 224. Similar to database manager 218 on client device 102, database manager 224 can manage and/or access digital content items on one or more databases accessible to online system 106. In particular, database manager 224 an include one or more full-size digital content items 230 stored on online system 106 and/or other database or storage accessible to online system 106. For example, client device 102 can provide copies of digital content items to online system 106 to store on database manager 224 to conserve storage space on client device 102. In some embodiments, online system 106 can provide a backup of digital content items 226 for original copies of digital content items stored on client device.

Moreover, database manager 224 can store analysis information 232 associated with one or more digital content items 230. In particular, upon generating analysis information, content item analyzer 222 can provide analysis information 232 to database manager 224 for storage on online system 106. In some embodiments, online system 106 can update or generate additional analysis information 232 as additional information becomes available to online system 106 or as a periodic process of generating up-to-date analysis information 232 associated with respective digital content items 230.

Figure 3:
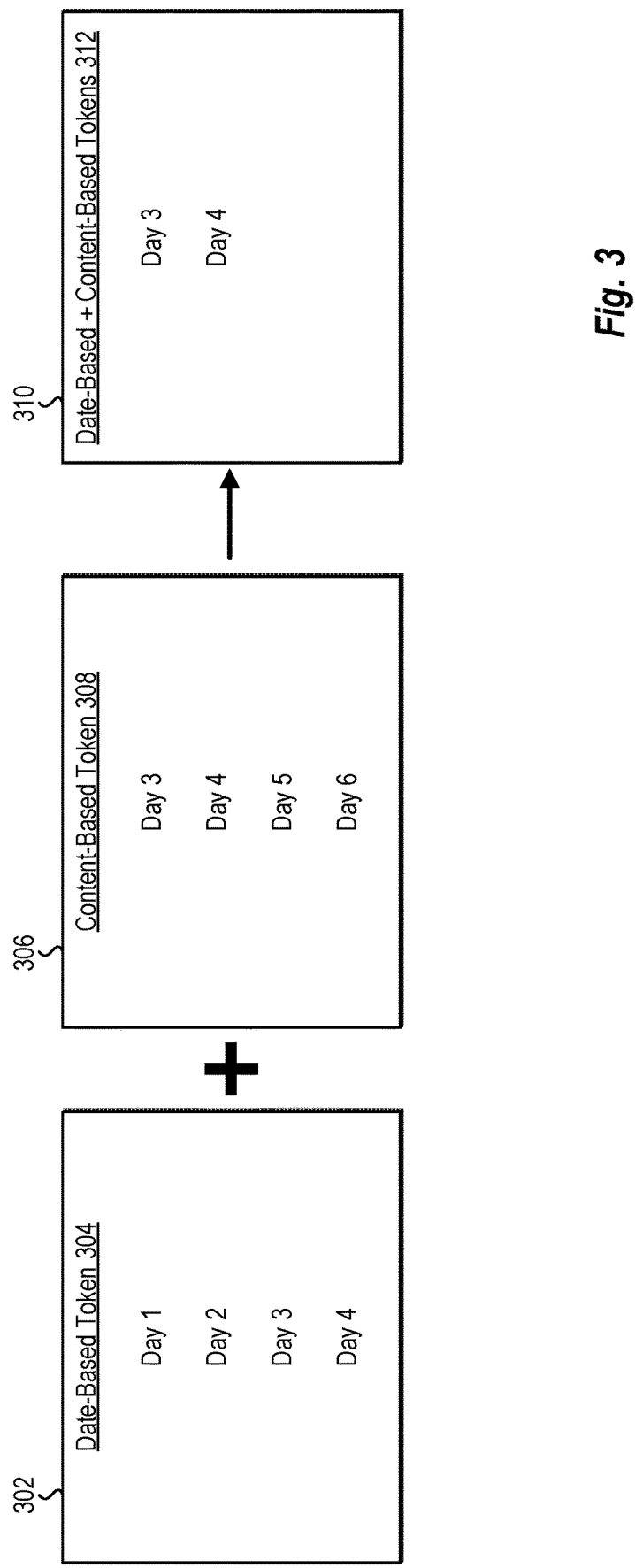
FIG. 3 illustrates a schematic diagram of digital content item indexes in accordance with one or more embodiments.

FIG. 3 illustrates a schematic diagram of indexes in accordance with one or more embodiments described herein. In particular, FIG. 3 illustrates one embodiment in which first index 302 and second index 306 are combined to provide combined index 310. For example, as mentioned above, content application 208 can identify multiple tokens based on a search query, and accordingly, content application 208 can identify digital content items corresponding to a combination of the tokens identified from the search query. In particular, content application 208 can identify digital content items in common between both first index 302 and second index 306.

As shown in FIG. 3, first index 302 is associated with a date-based token 304. For example, a date-based token 304 can include a token that is directly associated with one or more days. In particular, and as illustrated in FIG. 3, the index 302 indicates that the date-based token 302 references content items corresponding to Day 1, Day 2, Day 3, and Day 4. Along the same lines, second index 306 can be associated with a content-based token 308. As shown in FIG. 3, second index 306 indicates the content-based token 306 references content items corresponding to Day 3, Day 4, Day 5, and Day 6.

As noted above, in the event that a collection of digital content is organized by date information (e.g., photos organized in chronological order), the selection of date-based token 304 alone can provide a full match to a search query. In other words, all of the digital content items associated with the Days 1-4 have the characteristic that corresponds to the date-based token 304. To illustrate, if the date-based token is "November," then the first index 302 would include a day reference to each day in November (regardless of the year) that had one or more digital content items. Accordingly, each of days 1-4 are only associated with digital content items that also correspond with "November."

In contrast, the selection of a content-based token 308 can produce a partial match to a search query. In other words, not of the digital content items associated with Days 3-6, illustrated in FIG. 3, may also be associated with the content-based token. To illustrate, if the content-based token is a location, such as "New York," then the second index 306 includes a day reference for each of the days that include at least one digital content item that corresponds to the token of New York. However, because it is possible for a user to visit more than one city in one day, Day 3 can include a digital content item associated with New York, but Day 3 can also include a digital content item associated with Boston. Accordingly, with content-based tokens, a day level search will only provide a partial match, and a sub-day search (e.g., second level search) can provide additional accuracy with generating results matching the content-based token, as well as the user search query.

In the event that a sub-day search, or a second level search, is needed, the content application 208 can cause an item-by-item search with respect to the token. For example, each of the digital content items included in Days 3-4 can include content information, metadata, or other information that can correspond to the token. To continue with the content-based token 308 from above, the content application 208 can provide a sub-day search of the digital content items within Days 3-4 for metadata indicating a location of New York. Therefore, based on the day level of search (first level), the pool of digital content items that potentially may match a token is greatly reduced, allowing the content application 208 to perform a sub-day search (second level) efficiently. As a result, the content application 208 can quickly and accurately locate digital content items associated with content-based tokens.

Regardless of whether two indexes both are associated with date-based tokens, content-based tokens, or one of each, the content application 208 can combine two indexes to create combined index 310. For example, and as discussed above, a user can provide a search query that includes two tokens 304 and 306. In such a case, the content application 208 can compare first index 302 and second index 306 to identify if there are any day references that overlap between first index 302 and second index 306. For example, and as illustrated in FIG. 3, both first index 302 and second index 306 include Day 3 and Day 4. In other words, content application 208 (e.g., search query manager 214) can identify an intersection of days between the first index 302 and the second index 306.

Based on identifying an intersection, content application 208 can either literally, or functionally, create combined index 310 that includes the intersecting day references. For instance, and as illustrated in FIG. 3, combined index 310 can include Day 3 and Day 4 references. In other words, Day 3 and Day 4 reference days for which there is at least one content item that is associated with both the token 304 and the token 308. If one of the tokens is a content-based token, then content application 208 may perform a second level search to accurately identify digital content items associated with both tokens 302 and 306. Furthermore, in the event that there are no intersecting day references between first index 302 and second index 306, the content application 208 would simply return a "No matches" message to the user indicating that there are not digital content items that correspond to both tokens.

Figure 4A:
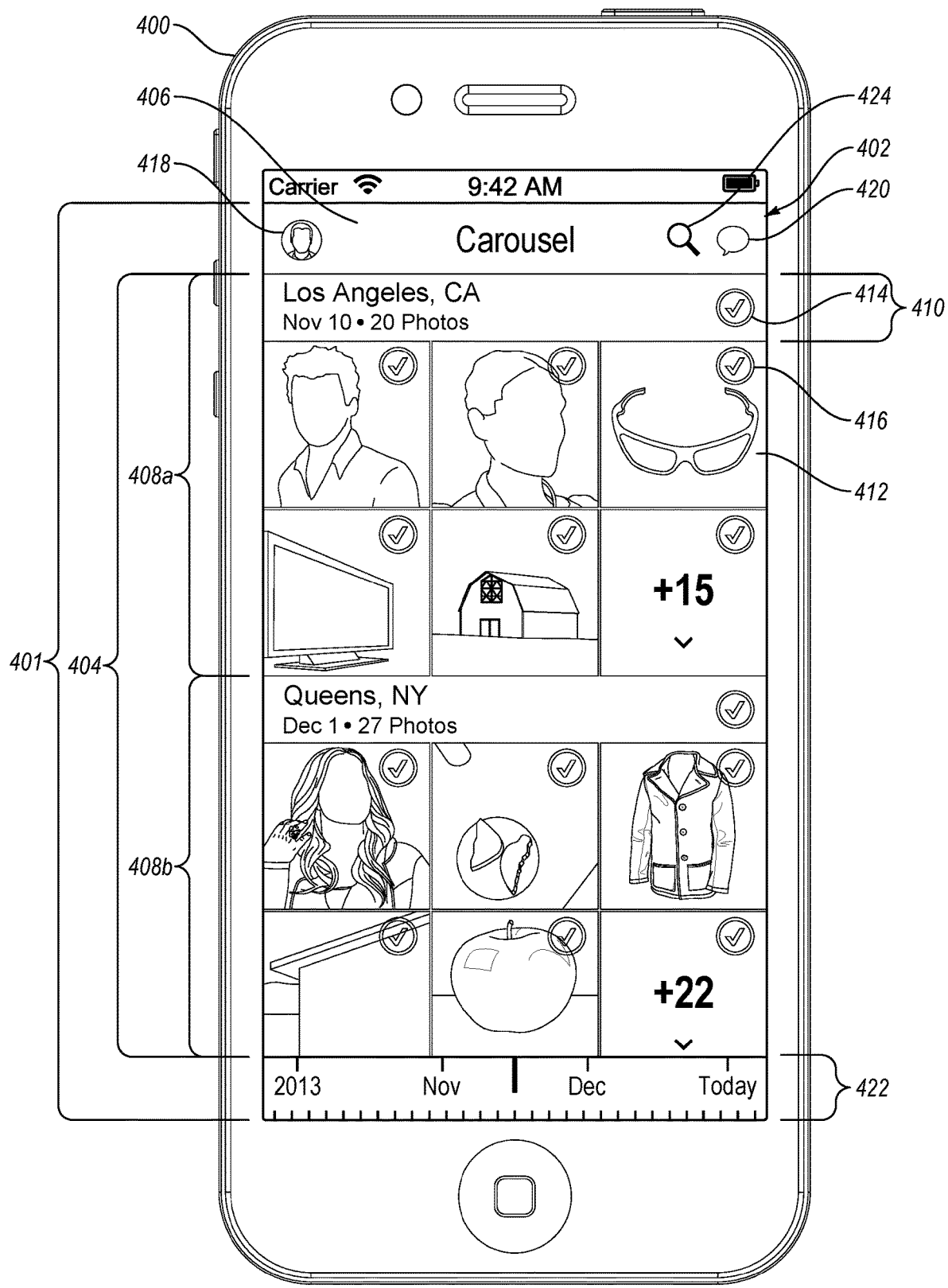
FIGS. 4A-4C illustrate example graphical user interfaces in accordance with one or more embodiments.

FIG. 4A illustrates an example client device 400 including graphical user interface 401 provided via touchscreen 402. In particular, FIG. 4A illustrates an example graphical user interface 401 associated with a content application (e.g., such as content application 208). For example, content application can provide a view area 404 within which to provide a gallery of digital content items via graphical user interface 401. For instance, and as illustrated in FIG. 4A, graphical user interface 401 can include a presentation of digital content items 412.

Additionally, graphical user interface 401 can include main header 406. Main header 406 can provide one or more objects or function symbols that enable a user to perform one or more functions with respect to the digital content items 412. For example, as illustrated in FIG. 4A, main header 406 can include profile icon 418 corresponding with a user or user profile associated with the gallery of digital content items. Additionally, main header 406 can include message icon 420, the selection of which can provide a communication interface to communicate with one or more other users of online system 106 (e.g., sending digital content items between users). Main header 406 can further include search element 424 for facilitating a search query within graphical user interface 401, as will be explained in further detail below. In addition, graphical user interface 401 can include scroll element 422 with which a user can interact to navigate within the gallery of digital content items (e.g., scroll the gallery of digital content items in a vertical direction).

Additionally, graphical user interface 401 can include one or more groups of digital content items 412. For example, as illustrated in FIG. 4A, graphical user interface 401 can include a display of first group 408a and second group 408b of digital content items. Additionally as shown in FIG. 4A, each group 408a-b can include group header 410. Group header 410 can include information associated with digital content items 412. For example, group header 410 can include a location, date, and/or number of digital content items 412 within group 408, as illustrated in FIG. 4. Additionally, each group header 408 and photo 410 can include group selector 414 with which a user can interact to select or de-select every digital content item within the group.

Similarly, graphical user interface 401 can include photo selector 416 associated with each digital content item 412 to allow a user to select or de-select one or more digital content items 412 one an item-by-item basis. For example, a user can select one or more digital content items 412 by selecting photo selector via touchscreen 402. Additionally, a user can select each photo 410 within group 408 of digital content items 412 by selecting group selector 414. For example, a user can select one or more digital content items 412 by performing a touch gesture on group selector 414 and/or one or more photo selectors 416.

Additionally, as mentioned above, content application can launch a search query to enable a user to search for one or more digital content items 412 within a gallery of photos. For example, as illustrated in FIG. 4A, graphical user interface 401 can include search element 424. In particular, upon detecting a user interaction with search element 424, the content application can launch a search query interface. For example, client device 102 can detect a tap gesture associated with search element 424 via a user interaction with touchscreen 402. In response to the detected user interaction, content application can provide a search query interface within graphical user interface 401.

Figure 4B:
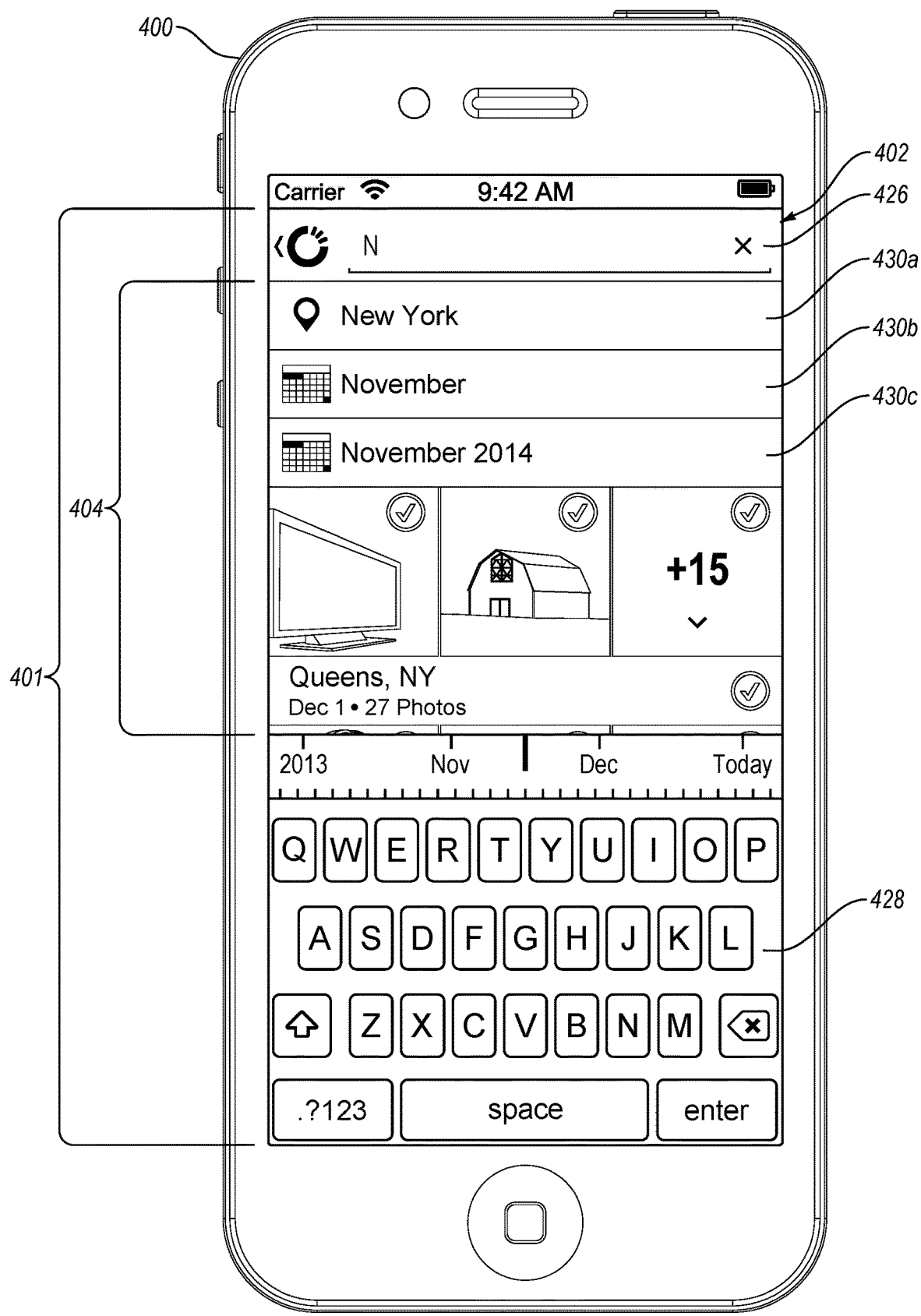

Similar to FIG. 4A, FIG. 4B illustrates an example client device 400 including touchscreen 402 and graphical user interface 401 including a presentation of a gallery of digital content items within view area 404 of graphical user interface 401. In particular, FIG. 4B illustrates graphical user interface 401 providing a search query interface. In some embodiments, client device 102 can facilitate presentation of graphical user interface 401 of FIG. 4B in response to detecting a selection of search element 424 described above in connection with FIG. 4A.

As illustrated in FIG. 4B, graphical user interface 401 associated with the search query can include query input field 426. In particular, search interface can include an area within graphical user interface 401 for presenting one or more characters making up a search query provided by a user. Additionally, as illustrated in FIG. 4B, graphical user interface 401 can include keyboard interface 428 to enable a user to provide one or more characters that make up the search query. Additionally, query input field 426 can include a presentation of each character provided by the user.

As mentioned above, query input field 426 can provide a presentation of one or more characters making up a search query. For example, FIG. 4B illustrates an example search query including a single character "N." Search query can include any number of characters. Further, in some embodiments, client device 102 can process a search query upon receiving each character from the user. For example, each additional character can represent a new search query. In some embodiments, client device 102 processes the search query in response to receiving each additional character from a user. Alternatively, client device 102 can process a search query upon detecting user selection of a completion character (e.g., tapping the enter key of keyboard interface 428) or upon completion of a predetermined period of time.

As mentioned above, content application 208 can cause the client device 400 to process a search query received from a user. In particular, client device 102 can identify one or more tokens and/or one or more digital content items based on the search query. As illustrated in FIG. 4B, client device 400 can provide a presentation of one or more token suggestions 430a-c in response to a search query. For example, graphical user interface 401 can include a drop-down menu including token suggestions 430a-c presented within graphical user interface 401 in response to receiving a search query from the user. Additionally, the user can select one of token suggestions 430 corresponding to one or more terms (e.g., tokens) that most closely matches the particular digital content items for which the user is searching.

FIG. 4B illustrates one example of a presentation of token suggestions 430a-c within graphical user interface 401. For example, in response to receiving a search query including a single "N" character, client device 400 can identify tokens or combinations of tokens, including a "New York" token suggestion 430a, a "November" token suggestion 430b, and a "November 2014" token suggestion 430c. Drop down menu of token suggestions 430 can include fewer or additional token suggestions 430. Additionally, as mentioned above, a user can select one of token suggestions 430a-c by using a tap or touch gesture on one of token suggestions 430a-c.

As further illustrated in FIG. 4B, each of the token suggestions can include an icon or graphical element indicating the type of digital content items likely associated with the token. For example, token suggestion 430a includes a location element for New York, and tokens 430b and 430c include a calendar element for November and November 2014. Other example icons can include a smiley face for people, a balloon for holidays or special occasions, one or more file type icons (e.g., video icon, document icon) for file type tokens, and so on. In the event that a combination token including two types of tokens is suggested, then the token suggestion can include two types of icons (e.g., a calendar and a location element).

In addition to providing a presentation of token suggestions 430, client device 400 can process a search query by identifying any digital content items that correspond to tokens identified based on the search query. For example, client device 400 can cause graphical user interface 401 to provide a modified gallery of digital content items that includes each digital content item that corresponds to some or all tokens that correspond to the search query. For example, in the example graphical user interface 401 illustrated in FIG. 4B, a modified gallery of digital content items can include a gallery of thumbnail images that correspond to each token suggestion 430a-c (e.g., thumbnails within the gallery that are not associated with "New York," "November," or "November 2014" are not included in the modified gallery).

Figure 4C:
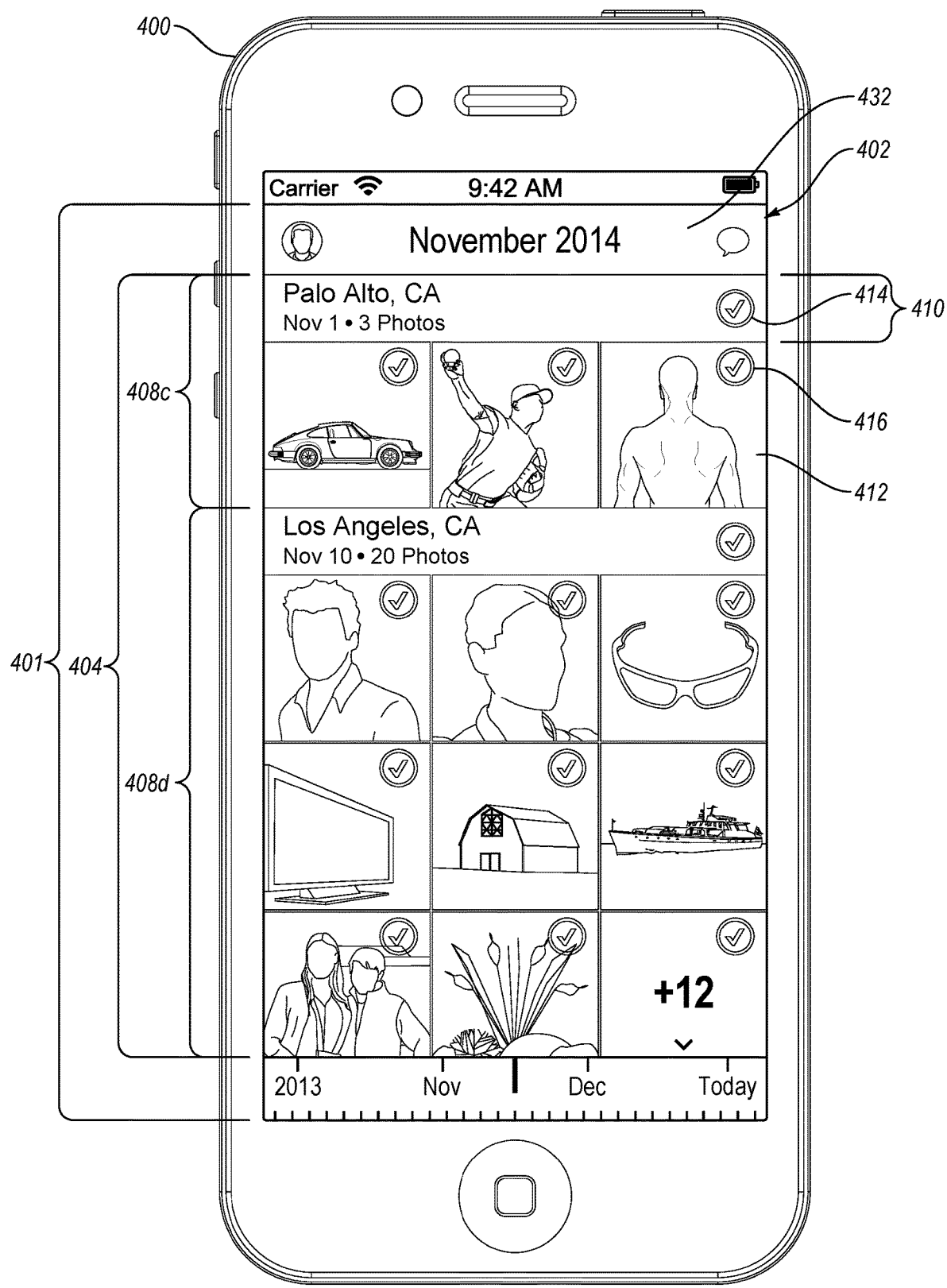

FIG. 4C illustrates an example client device 400 including touchscreen 402 and graphical user interface 401. In particular, graphical user interface 401 of FIG. 4C includes an example presentation of a modified gallery of digital content items within view area 404 of graphical user interface 401. For example, in response to receiving a search query, a user can select one of selectable token suggestions 430 illustrated in FIG. 4B. In particular, FIG. 4C may represent an example representation of a modified gallery in response to detecting a selection of third token suggestion 430c including a token of "November 2014" or, alternatively, a combination of tokens "November" and "2014."

As illustrated in FIG. 4C, graphical user interface 401 can include main header 406 including a presentation of a selected token or combination of tokens. For example, main header 406 can represent selected tokens "November" and "2014." Additionally, graphical user interface 401 can include first group 408c and second group 408d. For example, first group 408c can include group header 410 and digital content items 412. Additionally, graphical user interface 401 can include group selector 414 and photo selectors 416. Additionally, graphical user interface 401 can include second group 408d and corresponding group header 410, digital content items 412, group selector 414, and photo selectors 416.

As illustrated in FIG. 4C, graphical user interface 401 can include a presentation of a modified gallery based on identified digital content items corresponding to identified tokens. For example, graphical user interface 401 can include a presentation of each thumbnail image within a gallery of photos that is associated with both a "November" token and a "2014" token. As such, the modified gallery can include each thumbnail image corresponding to photos that are associated with the identified tokens. In some embodiments, for example, the modified gallery can include thumbnail images that represent each photo identification within respective indexes for the identified tokens.

Figure 5:
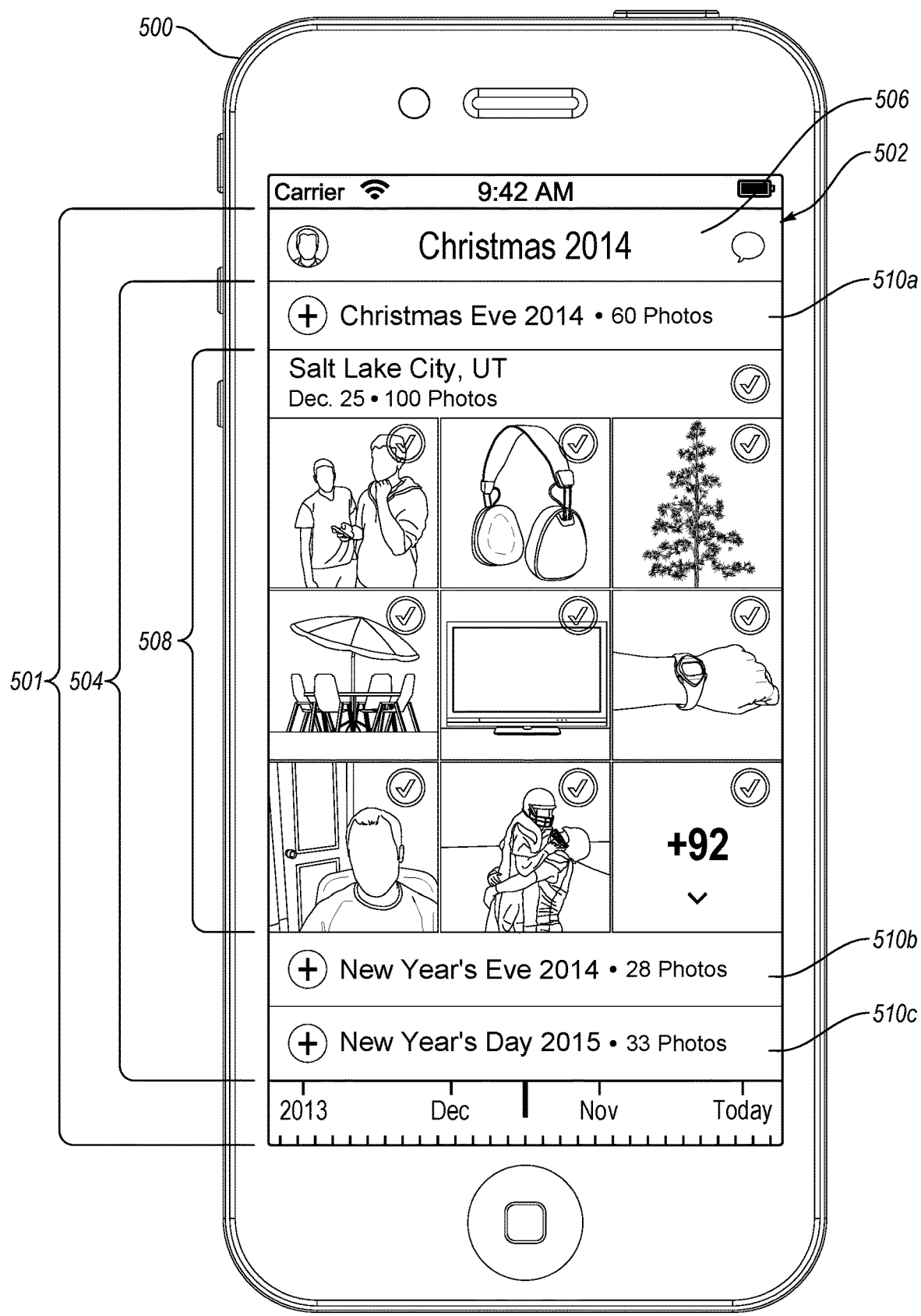
FIG. 5 illustrates an additional example of a graphical user interface in accordance with one or more embodiments.

FIG. 5 illustrates another example of client device 500 including touchscreen 502 and graphical user interface 501. In particular, graphical user interface 501 of FIG. 5 includes an example presentation of a modified gallery 508 of digital content items within view area 504 of graphical user interface 501. Additionally, as illustrated, graphical user interface 501 can include main header 506 including a presentation of the selected tokens from a search query. For example, graphical user interface 501 can include a presentation of a modified gallery of digital content items that are associated with a "Christmas" token and a "2014" token. In other words, the modified gallery of digital content items can include content items associated with Dec. 25, 2014.

Additionally, as illustrated in FIG. 5, graphical user interface 501 can include one or more additional gallery expansion suggestions 510a-c for the modified gallery 508. For example, based on a proximity or similarity of one or more tokens, client device 500 can identify and present one or more tokens or combinations of tokens that a user may find relevant to the presentation of digital content items. For instance, in an example including tokens associated with dates, client device 500 can identify tokens associated with dates that are within close temporal proximity (e.g., day, week, month) to the identified token corresponding to the selected digital content items.

While not illustrated in FIG. 5, client device 500 can further identify and present different gallery expansion suggestions 510 associated with different types of tokens that a user may find relevant to the presentation of digital content items. For instance, in an example including tokens associated with locations, client device 500 can identify tokens associated with locations that are within close geographic proximity (e.g., nearby city, state) to the identified token corresponding to the selected digital content item. Additionally or alternatively, client device can identify and gallery expansion suggestions 510 associated with different people, or a combination of different people and a location.

In the example of FIG. 5, for instance, graphical user interface 501 can include a presentation modified gallery 508 including digital content items that were taken on Christmas 2014. However, a collection of photos may also include one or more photos taken on adjacent days or holidays that a user may find relevant or of interest to include in the modified gallery 508. As such, graphical user interface 501 may include gallery expansion suggestions 510a-c including one or more tokens that may be related to the currently selected tokens of Christmas 2014. For example, and as illustrated in FIG. 5, gallery expansion suggestions 510a-c related to Christmas 2014 may include, "Christmas Eve 2014," "New Year's Eve 2014", and "New Year's Day 2015."

In some embodiments, a user can select one or more gallery expansion suggestions 510a-c to expand the modified gallery to include additional digital content items corresponding to the additional token(s) associated with the selected one or more gallery expansion suggestions. For example, upon detecting a selection of first gallery suggestion 510a (e.g., user input detector 204 detecting a touch gesture with respect to the "+" element) graphical user interface 501 can expand to include additional thumbnail images. Further, upon detecting a selection of second gallery suggestion 510b and third gallery suggestion 510c, graphical user interface 501 can expand to include corresponding thumbnail images. As illustrated in FIG. 5, a user can select any number of gallery suggestions 510.

Figure 6:
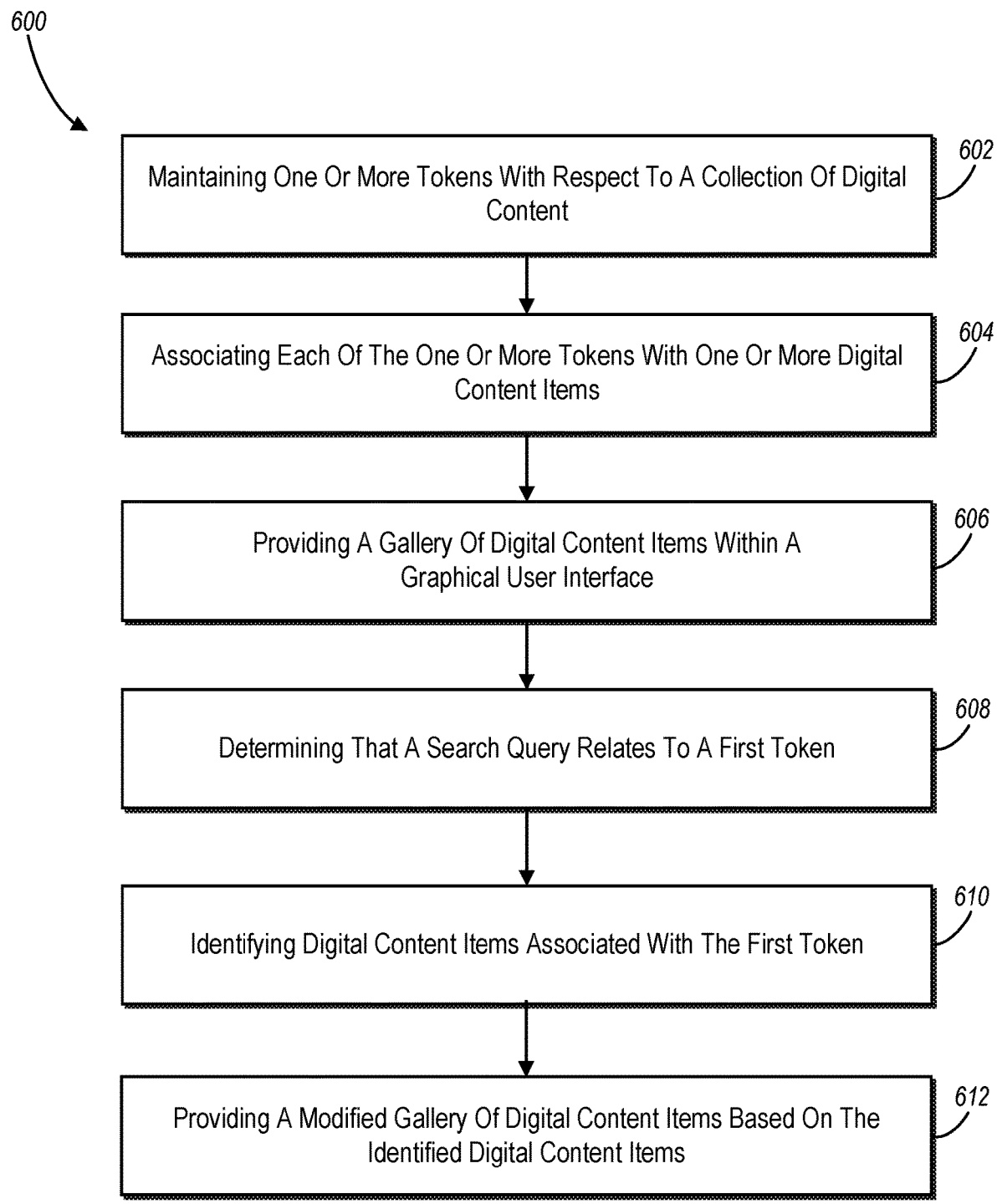
FIG. 6 illustrates a flowchart of a series of acts in a method of searching digital content items in accordance with one or more embodiments.

FIG. 6 illustrates a flowchart of one example method 600 of searching a collection of digital content and presenting digital content in accordance with the search. While FIG. 6 illustrates example steps according to one embodiment, other embodiments may omit, add to, reorder, and/or modify any of the steps shown in FIG. 6. One or more steps shown in FIG. 6 may be performed by any of the components illustrated in system 100 illustrated in FIG. 1. Further, one or more steps of method 600 may be performed by client device 102, online content management system 106, or a combination of both.

Method 600 includes step 602, which may include maintaining one or more tokens with respect to a collection of digital content. Each of the one or more tokens can correspond to a characteristic of at least one digital content item within the collection of digital content. One or more tokens can correspond to a date (e.g., day, year, month). Additionally, one or more tokens can correspond to a location (e.g., city, state, country, GPS location, location name, location type). Additionally, one or more tokens can correspond to an occasion or event, such as a particular holiday. Further, The collection of digital content can include various types of content, such as photos or videos.

Additionally, method 600 includes step 604, which may include associating each of the one or more tokens with one or more digital content items (e.g., within the collection of digital content). Step 604 may include associating one or more tokens with one or more digital content items based on one or more characteristics of each digital content item within the collection of digital content. In some embodiments, associating each of the one or more tokens with one or more digital content items includes generating an index for each of the one or more tokens. Each index can include a reference (e.g., a day) to one or more digital content items from the collection of digital content. In some embodiments, generating the index can include identifying one or more characteristics of digital content items within the collection of digital content. Further, identifying the one or more digital content items associated with the first token can include identifying an index corresponding to the first token.

Additionally, method 600 includes step 606, which may include providing a gallery of digital content items within a view area of a graphical user interface to a user. The gallery of digital content items can include the collection of digital content. In some embodiments, providing the gallery can include providing a gallery of thumbnail images corresponding to respective digital content items.

Additionally, method 600 includes step 608, which may include determining that a search query relates to a first token of the one or more tokens. Further, method 600 can include determining that the search query corresponds to a second token. In some embodiments, method 600 can include identifying each digital content item of the one or more digital content items associated with both the first token and the second token.

The search query can include one or more characters. In some embodiments, determining that the search query relates to the first token can include presenting a listing a listing of token suggestions related to a character of the search query. Additionally, determining that the search query relates to the first token can include receiving a user selection of a token suggestion from the listing of token suggestions.

Additionally, method 600 includes step 610, which may include identifying one or more digital content items associated with the first token from among the collection of digital content items. Step 610 may include identifying the one or more digital content items based on determining that the first token relates to the search query. In some embodiments, identifying each digital content item of the gallery is based on the selected token suggestion. The token suggestion can include multiple tokens.

Additionally, method 600 includes step 612, which may include providing a modified gallery of digital content items to the user. Step 612 may include providing the modified gallery within the view area of the graphical user interface based on the identified one or more digital content items. In some embodiments, step 612 may include providing the modified gallery further based on the identified digital content items associated with both the first token and a second token. Providing the modified gallery can include providing only the identified digital content items within the modified gallery. Further, providing the modified gallery can include modifying the gallery of digital content items by removing any digital content items within the gallery of digital content items that are not the identified one or more digital content items.

Additionally, while not shown in FIG. 6, method 600 can include one or more additional steps. For example, method 600 can include providing an option to identify one or more additional content items from among the collection of digital content related to the identified digital content items. Additionally, method 600 can include providing a further modified gallery of digital content items within the view area of the graphical user interface based on the identified digital content items and the one or more additional digital content items within the graphical user interface.

Figure 7:
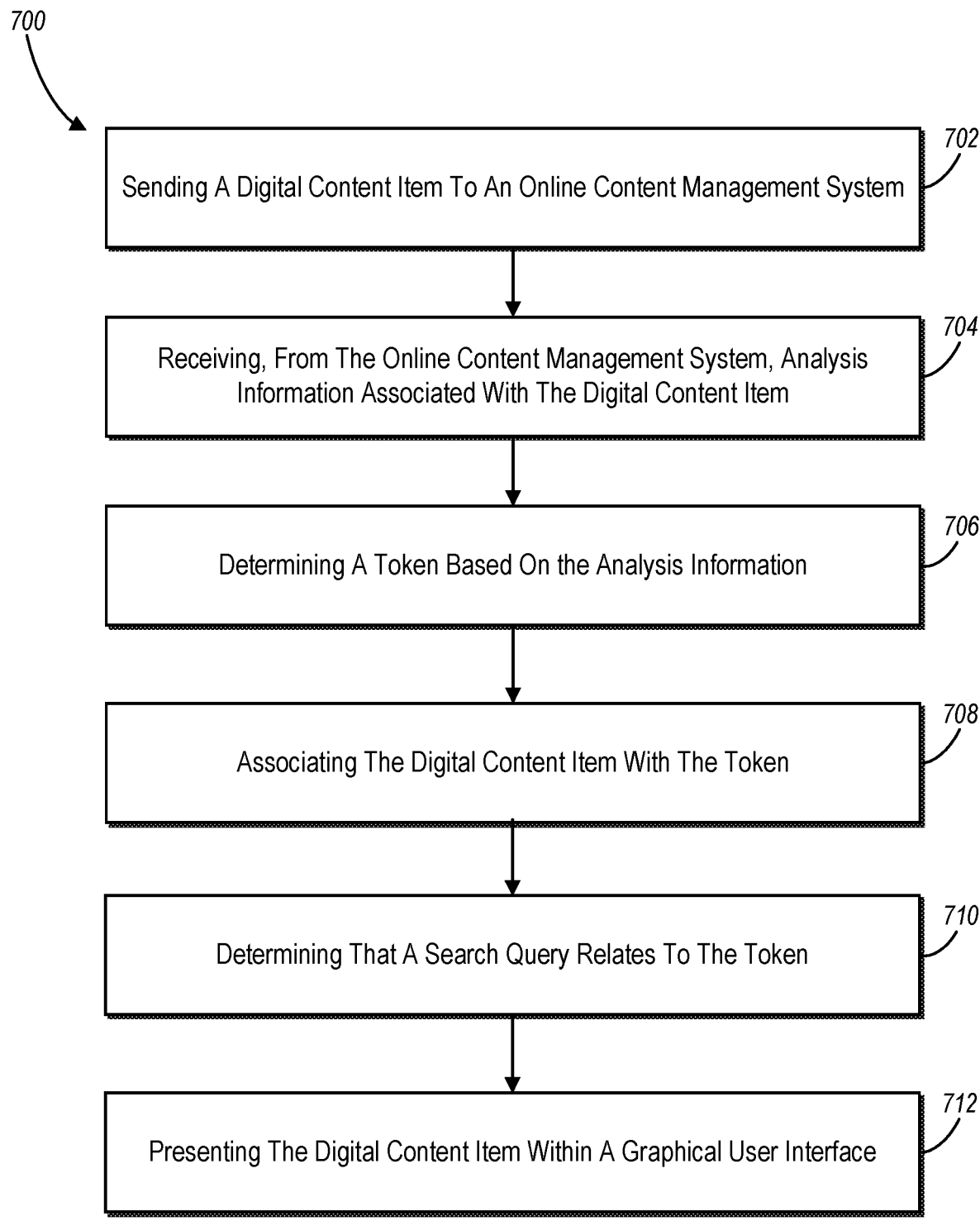
FIG. 7 illustrates a flowchart of a series of acts in a method of searching digital content items in accordance with one or more embodiments.

FIG. 7 illustrates a flowchart of one example method 700 of searching a collection of digital content and presenting digital content in accordance with the search. While FIG. 7 illustrates example steps according to one embodiment, other embodiments may omit, add to, reorder, and/or modify any of the steps shown in FIG. 7. One or more steps shown in FIG. 7 may be performed by any of the components illustrated in system 100 illustrated in FIG. 1. Further, one or more steps of method 700 may be performed by client device 102, online content management system 106, or a combination of both.

Method 700 includes step 702, which may include sending a digital content item to an online content management system from a client device. Method 700 further includes step 704, which may include receiving analysis information associated with the digital content item from the online content management system. The analysis information may be related to a characteristic of the digital content item. In some embodiments, the analysis information can include location information and/or content information associated with the digital content item. Further, method 700 includes step 706, which may include determining a token based on the analysis information. The token may be representative of the characteristic of the digital content item. Method 700 further includes step 708, which may include associating the digital content item with the token. Method 700 also includes step 710, which may include determining that a search query (e.g., from a user) relates to the token. Further, method 700 includes step 712, which may include presenting the digital content item within a graphical user interface. Step 712 can further include presenting the digital content item based on determining that the search query relates to the token.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
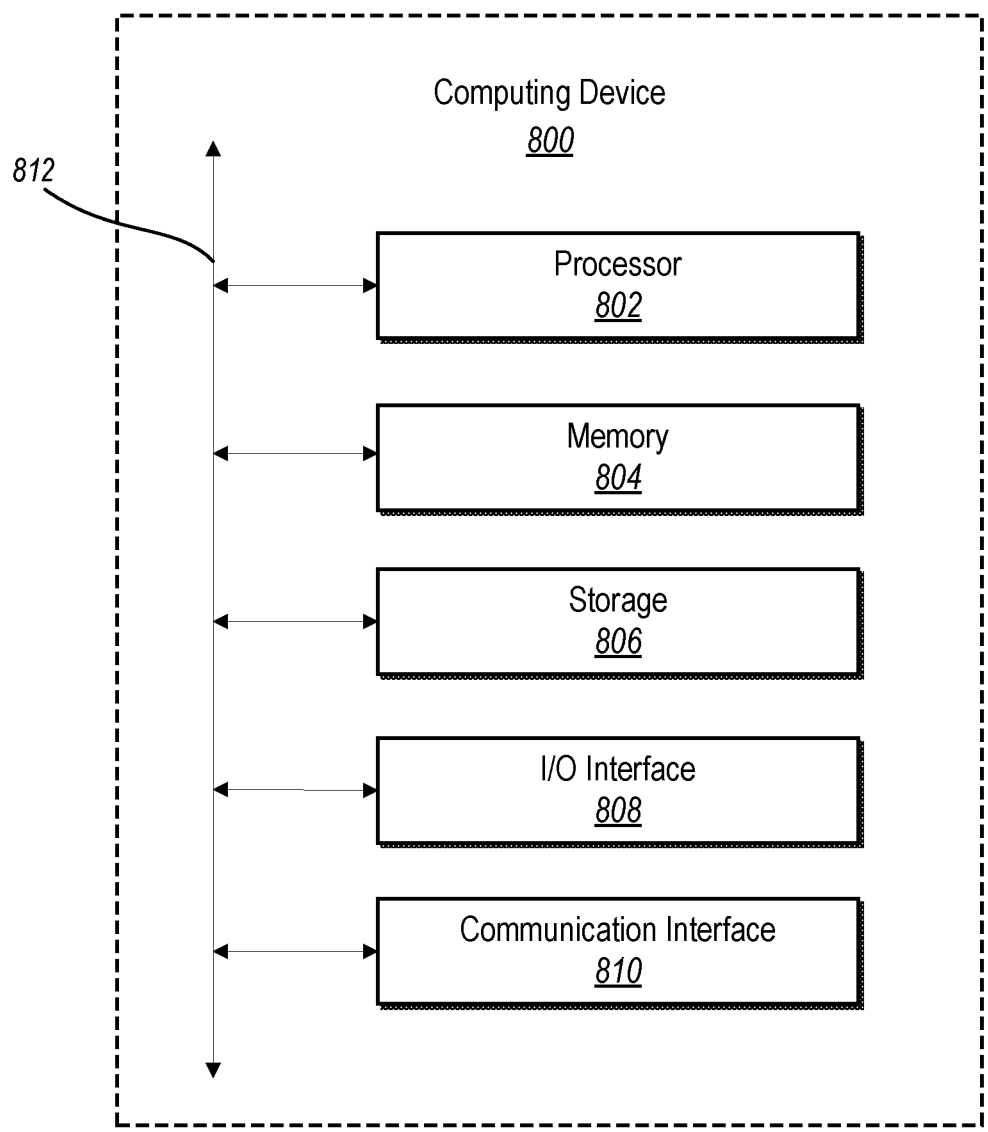
FIG. 8 illustrates a block diagram of a computing device in accordance with one or more embodiments.

FIG. 8 illustrates a block diagram of exemplary computing device 800 that may be configured to perform one or more of the processes described above. One will appreciate that client device 102 and online content management system 106 each may be implemented by one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
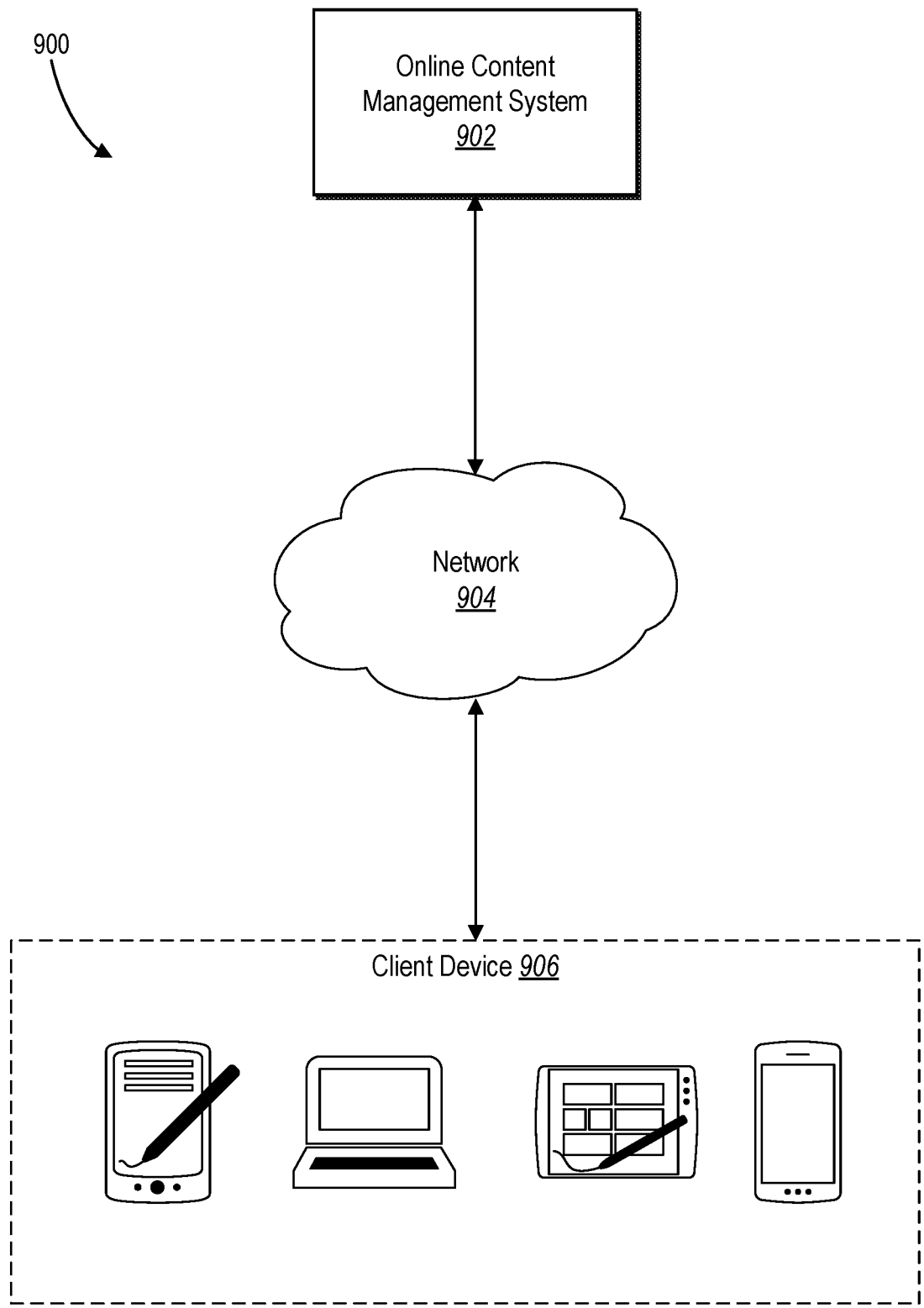
FIG. 9 illustrates a networking environment of an online content management system in accordance with one or more embodiments.

FIG. 9 is a schematic diagram illustrating an environment 900 within which one or more embodiments of content management system 100 can be implemented. Online content management system 902 may generate, store, manage, receive, and send digital content. For example, online content management system 902 may send and receive digital content to and from client devices 906 by way of network 904. In particular, online content management system 902 can store and manage a collection of digital content. Online content management system 902 can manage the sharing of digital content between computing devices associated with a plurality of users. For instance, online content management system 902 can facilitate a user sharing a digital content with another user of online content management system 902.

In particular, online content management system 902 can manage synchronizing digital content across multiple client devices 906 associated with one or more users. For example, a user may edit digital content using client device 906. The online content management system 902 can cause client device 906 to send the edited digital content to online content management system 902. Online content management system 902 then synchronizes the edited digital content on one or more additional computing devices.

In addition to synchronizing digital content across multiple devices, one or more embodiments of online content management system 902 can provide an efficient storage option for users that have large collections of digital content. For example, online content management system 902 can store a collection of digital content on online content management system 902, while the client device 906 only stores reduced-sized versions of the digital content. A user can navigate and browse the reduced-sized versions (e.g., a thumbnail of a digital photo) of the digital content on client device 906. In particular, one way in which a user can experience digital content is to browse the reduced-sized versions of the digital content on client device 906.

Another way in which a user can experience digital content is to select a reduced-size version of digital content to request the full-size version of digital content from online content management system 902. In particular, upon a user selecting a reduced-sized version of digital content, client device 906 sends a request to online content management system 902 requesting the digital content associated with the reduced-sized version of the digital content. Online content management system 902 can respond to the request by sending the digital content to client device 906. Client device 902, upon receiving the digital content, can then present the digital content to the user. In this way, a user can have access to large collections of digital content while minimizing the amount of resources used on client device 906.

Client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access online content management system 902.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
    determining, utilizing a content item analyzer, metadata from a user specific collection of digital images;
    generating an index of terms from the metadata of the user specific collection of digital images, the user specific collection of digital images comprising a plurality of digital image groups;
    providing for display within a graphical user interface of a client application:
        a first plurality of digital images within a view area of the graphical user interface, the first plurality of digital images being part of the user specific collection of digital images; and
        a search input field for receiving text input to be applied in a search of the user specific collection of digital images;
    receiving, via the search input field, user input comprising at least one text character;
    comparing the at least one text character with the index of terms from the user specific collection of digital images associated with a user to identify terms comprising the at least one text character;
    generating a plurality of suggested search queries based on the identified terms from the user specific collection of digital images;
    based on the plurality of suggested search queries, identifying a first set of digital images belonging to each group of the plurality of digital image groups corresponding to a first suggested search query of the plurality of suggested search queries; and
    based on receiving a selection of the first suggested search query, providing, for displaying within the graphical user interface, the identified first set of digital images within each identified digital image group that corresponds to the first suggested search query, the identified first set of digital images in an expanded group format.

2. The method of claim 1, wherein providing, for display within the graphical user interface, the plurality of suggested search queries further comprises:
    providing for display via the graphical user interface, one or more gallery expansion suggestions;
    wherein the one or more gallery expansion suggestions include one or more collections of digital images and one or more terms from the index of terms that corresponds with the at least one text character.

3. The method of claim 1, further comprising:
    causing a client device associated with the user to store the user specific collection of digital images on the client device; and wherein the index of terms is based on the user specific collection of digital images stored on the client device.

4. The method of claim 1, further comprising providing a set of digital images from the user specific collection of digital images associated with one or more of the plurality of suggested search queries while providing the plurality of suggested search queries.

5. The method of claim 1, wherein the index of terms comprises terms associated with characteristics corresponding to one or more digital images within the user specific collection of digital images, the characteristics comprising at least one of: a temporal characteristic, a location characteristic, a business entity, an event, a source characteristic, a content type, a content characteristic, or a user identification.

6. The method of claim 1, wherein at least one suggested search query from the plurality of suggested search queries comprises a combination of two or more terms from the index of terms.

7. The method of claim 1, further comprising:
determining a query type for at least one suggested search query of the plurality of suggested search queries; and
providing, proximate to the at least one suggested search query within the graphical user interface, a search query type icon corresponding to the query type.

8. A system comprising:
at least one processor; and
at least one non-transitory computer-readable storage medium storing instructions that, when executed by the at least one processor, cause the system to:
determine, utilizing a content item analyzer, metadata from a user specific collection of digital images;
generate an index of terms from the metadata of the user specific collection of digital images, the user specific collection of digital images comprising a plurality of digital image groups;
provide, within a graphical user interface on a client device, a search input field for receiving text input to be applied in a search of the user specific collection of digital images;
receive, via the search input field, user input comprising at least one text character;
compare the at least one text character with the index of terms from the user specific collection of digital images associated with a user account to identify terms comprising the at least one text character;
generate a plurality of suggested search queries based on the identified terms from the user specific collection of digital images;
based on the plurality of suggested search queries, identify a first set of digital images belonging to each group of the plurality of digital image groups corresponding to a first suggested search query of the plurality of suggested search queries; and
based on receiving a selection of the first suggested search query, display within the graphical user interface, the identified first set of digital images within each identified digital image group that corresponds to the first suggested search query, the identified first set of digital images in an expanded group format.

9. The system of claim 8, wherein one or more of the plurality of suggested search queries correspond to at least one of: a location, a date, a person, content within an image, or an event.

10. The system of claim 8, further comprising instructions that, when executed by the at least one processor, cause the system to:
provide for display via the graphical user interface, one or more gallery expansion suggestions;
wherein the one or more gallery expansion suggestions include one or more collections of digital images and one or more terms from the index of terms that corresponds with the at least one text character.

11. The system of claim 8, further comprising instructions that, when executed by the at least one processor, cause the system to:
cause the client device associated with the user account to locally store the user specific collection of digital images; and
wherein the index of terms is based on the user specific collection of digital images locally stored on the client device.

12. The system of claim 8, further comprising instructions that, when executed by the at least one processor, cause the system to:
in response to receiving an additional text character from the user account, process the search of the user specific collection of digital images based on the additional text character; and
provide, within the graphical user interface, at least one digital image from the user specific collection of digital images that is associated with both the selection of the first suggested search query and the additional text character.

13. The system of claim 8, wherein the index of terms comprises terms associated with characteristics corresponding to one or more digital images within the user specific collection of digital images, the characteristics comprising at least one of: a temporal characteristic, a location characteristic, a business entity, an event, a source characteristic, a content type, an image content characteristic, or a user identification.

14. The system of claim 8, further comprising instructions that, when executed by the at least one processor, cause the system to provide, within the graphical user interface, an indication of a number of digital images associated with the selection of the first suggested search query from the plurality of suggested search queries.

15. A non-transitory computer readable storage medium comprising instructions that, when executed by at least one processor, cause a client device to:
determine, utilizing a content item analyzer, metadata from a user specific collection of digital images;
generate an index of terms from the metadata of the user specific collection of digital images, the user specific collection of digital images comprising a plurality of digital image groups;
provide for display within a graphical user interface of a client application on the client device:
a view area for navigating through the user specific collection of digital images associated with a user account; and
a search input field for receiving text input to be applied in a search of the user specific collection of digital images associated with the user account;
receive, via the search input field, at least one text character;
based on the at least one text character, identify terms within the index of terms corresponding to the user specific collection of digital images associated with the user account;
generate a plurality of suggested search queries based on the identified terms;

based on the plurality of suggested search queries, identify a first set of digital images belonging to each group of the plurality of digital image groups corresponding to a first suggested search query of the plurality of suggested search queries; and based on receiving a selection of the first suggested search query, display within the graphical user interface, the identified first set of digital images within each identified digital image group that corresponds to the first suggested search query, the identified first set of digital images in an expanded group format.

16. The non-transitory computer readable storage medium of claim 15, further comprising instructions that, when executed by the at least one processor, cause the client device to:

provide for display via the graphical user interface, one or more gallery expansion suggestions;

wherein the one or more gallery expansion suggestions include one or more collections of digital images and one or more terms from the index of terms that corresponds with the at least one text character.

17. The non-transitory computer readable storage medium of claim 15, wherein each suggested search query of the plurality of suggested search queries is associated with one or more digital images within the user specific collection of digital images associated with the user account.

18. The non-transitory computer readable storage medium of claim 15, further comprising instructions that, when executed by the at least one processor, cause the client device to:

locally store the user specific collection of digital images; and wherein the index of terms is based on the user specific collection of digital images locally stored on the client device.

19. The non-transitory computer readable storage medium of claim 15, wherein the index of terms comprises terms associated with characteristics corresponding to one or more digital images within the user specific collection of digital images, the characteristics comprising at least one of: a temporal characteristic, a location characteristic, a business entity, an event, a source characteristic, a content type, an image content characteristic, or a user identification.

20. The non-transitory computer readable storage medium of claim 15, further comprising instructions that, when executed by the at least one processor, cause the client device to provide, within the graphical user interface, an indication of a number of digital images associated with the selection of the first suggested search query from the plurality of suggested search queries.

* * * * *